(12) United States Patent
Perry

(10) Patent No.: US 10,997,576 B2
(45) Date of Patent: *May 4, 2021

(54) SYSTEMS AND METHODS FOR EMULATING A POINT OF SALE ON A MOBILE DEVICE

(71) Applicant: Excentus Corporation, Dallas, TX (US)

(72) Inventor: Dickson Perry, Dallas, TX (US)

(73) Assignee: Excentus Corporation, Dallas, TX (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/431,342

(22) Filed: Jun. 4, 2019

(65) Prior Publication Data

US 2019/0287093 A1    Sep. 19, 2019

Related U.S. Application Data

(63) Continuation of application No. 14/306,144, filed on Jun. 16, 2014, now Pat. No. 10,360,551.

(51) Int. Cl.
*G06Q 20/20* (2012.01)
*G06Q 30/02* (2012.01)
*G06Q 20/32* (2012.01)

(52) U.S. Cl.
CPC .......... *G06Q 20/322* (2013.01); *G06Q 20/20* (2013.01); *G06Q 20/202* (2013.01);
(Continued)

(58) Field of Classification Search
CPC .... G06Q 20/322; G06Q 20/202; G06Q 20/20; G06Q 30/0226; G06Q 30/0267
(Continued)

(56) References Cited

U.S. PATENT DOCUMENTS 7,155,199 B2    12/2006    Zalewski et al.
7,487,112 B2    2/2009    Barnes, Jr.
(Continued)

OTHER PUBLICATIONS

Bertagnoli, L., "As gas station skimmer card fraud increases, here's how to cut risk," https://www.creditcards.com/credit-card-news/gas-station-skimmer-fraud.php, last accessed Oct. 25, 2017, 6 pages.

*Primary Examiner* — Florian M Zeender
*Assistant Examiner* — Christopher R Buchanan
(74) *Attorney, Agent, or Firm* — Norton Rose Fulbright US LLP

(57) ABSTRACT

A method for emulating a point of sale (POS) at a mobile device includes identifying a POS based on information associated with the POS received from a mobile device. The method includes generating emulation data descriptive of information captured at the POS, and initiating transmission of the emulation data to the mobile device. The emulation data causes the mobile device to emulate the POS at a display device of the mobile device. The information captured at the POS is associated with a consumer transaction. The method includes dynamically generating updated emulation data as the information captured at the POS changes during the consumer transaction, and initiating transmission of the updated emulation data to the mobile device. The updated emulation data causes the emulation of the POS at the display device of the mobile device to be dynamically updated during the consumer transaction.

20 Claims, 5 Drawing Sheets

(52) U.S. Cl.
CPC ....... *G06Q 20/204* (2013.01); *G06Q 30/0226* (2013.01); *G06Q 30/0267* (2013.01)

(58) Field of Classification Search
USPC .............................................. 705/14.27, 16
See application file for complete search history.

(56) References Cited

U.S. PATENT DOCUMENTS

| | | | |
|---|---|---|---|
| 7,822,688 | B2 | 10/2010 | Labrou et al. |
| 7,917,439 | B2 | 3/2011 | Barnes, Jr. |
| 8,484,086 | B2 | 7/2013 | Pavlic et al. |
| 8,566,168 | B1 | 10/2013 | Bierbaum et al. |
| 8,611,919 | B2 | 12/2013 | Barnes, Jr. |
| 9,384,162 | B2 * | 7/2016 | Tsai .................... G06F 13/4022 |
| 2007/0276763 | A1 | 11/2007 | Kleinman et al. |
| 2009/0294526 | A1 * | 12/2009 | Maw .................. G06K 7/10465 235/380 |
| 2010/0082444 | A1 | 4/2010 | Lin et al. |
| 2011/0022515 | A1 * | 1/2011 | Tallitsch ............ G06Q 20/3255 705/40 |
| 2011/0112898 | A1 * | 5/2011 | White .................. G06Q 20/202 705/14.38 |
| 2012/0271725 | A1 * | 10/2012 | Cheng .................... H04W 4/21 705/21 |
| 2012/0278727 | A1 | 11/2012 | Ananthakrishnan et al. |
| 2012/0317628 | A1 * | 12/2012 | Yeager ................. G06Q 20/204 726/5 |
| 2013/0024371 | A1 | 1/2013 | Hariramani et al. |
| 2013/0098984 | A1 * | 4/2013 | Shenker ................... G06K 7/01 235/375 |
| 2013/0132218 | A1 * | 5/2013 | Aihara ............... G06Q 20/3276 705/21 |
| 2013/0246171 | A1 | 9/2013 | Carapelli |
| 2013/0275641 | A1 | 10/2013 | Tsai et al. |
| 2014/0089116 | A1 | 3/2014 | Argue et al. |
| 2014/0100692 | A1 | 4/2014 | Chittenden, Jr. et al. |
| 2014/0316588 | A1 | 10/2014 | Giera et al. |
| 2014/0351138 | A1 | 11/2014 | Frieden et al. |
| 2014/0372221 | A1 | 12/2014 | Momin et al. |
| 2015/0120476 | A1 | 4/2015 | Harrell |
| 2015/0126109 | A1 | 5/2015 | Keshavdas et al. |
| 2015/0149284 | A1 | 5/2015 | Williams et al. |
| 2015/0199684 | A1 * | 7/2015 | Maus .................... G06Q 20/30 705/71 |
| 2015/0339648 | A1 * | 11/2015 | Kushevsky ............ G06Q 20/32 705/21 |
| 2017/0178095 | A1 | 6/2017 | Mathew et al. |
| 2019/0272517 | A1 * | 9/2019 | Paulo Rodrigues ..... G07G 1/14 |

\* cited by examiner

SYSTEMS AND METHODS FOR EMULATING A POINT OF SALE ON A MOBILE DEVICE

CROSS-REFERENCE TO RELATED APPLICATIONS

The present application is a continuation of U.S. patent application Ser. No. 14/306,144 filed Jun. 16, 2014 and entitled "SYSTEMS AND METHODS FOR EMULATING A POINT OF SALE ON A MOBILE DEVICE." The present application is also related to co-pending and commonly assigned U.S. patent application Ser. No. 14/306,140 filed Jun. 16, 2014 and entitled "SYSTEMS AND METHODS FOR EMULATING A FUEL PUMP AND MARKETING ON A MOBILE DEVICE," the disclosures of which are incorporated herein by reference in their entirety.

TECHNICAL FIELD

The present disclosure is generally related to point of sale (POS) systems, and more particularly to emulating a POS.

BACKGROUND OF THE INVENTION

Use of point of sale (POS) systems is common in places where consumers purchase products and services, such as grocery stores, convenience stores, department stores, sporting events, restaurants, etc. A POS may include an input device, such as a barcode scanner or a touchscreen display, that may be used to provide input to the POS, such as information associated with products and/or services being purchased. The information may include a cost associated with each of the products and/or the services being purchased. The POS may be configured to calculate a total sales price for the products and/or the services being purchased.

The POS may also be configured to receive payment information. For example, the consumer may provide cash to a cashier and the cashier may input the amount of cash received to the POS. The POS may then reduce the total sales price for the goods and/or services purchased and calculate a difference between the amount of cash received and the total sales price. The amount of the difference, if any, may be provided from the cashier to the consumer as change. As another example, the POS may include a financial card reader configured to read information from a magnetic stripe of a financial card, such as a debit card, a credit card, a pre-paid financial card, and/or a gift card, and to process payment for the products and/or services based on the information read from the magnetic stripe of the financial card. Some financial cards (e.g., gift cards) may include a barcode and payment information that may be retrieved from the card using the input device (e.g., the barcode scanner) of the POS. The POS may also include a check reader configured to read information included on a check, such as a routing number and account number. The POS may also be configured to process payments using multiple financial cards or a combination of cash, financial cards, and checks.

The POS may also include a display that presents information associated with a transaction that is occurring at the POS. For example, as a consumer is checked out at a grocery store, products being purchased by the consumer may be scanned using the input device (e.g., the barcode scanner) of the POS, and as the products are scanned, information associated with the products, such as a sales price of each of the products and a brief description of each of the products, may be presented at the display device.

BRIEF SUMMARY OF THE INVENTION

Disclosed herein are embodiments of systems and methods for emulating a point of sale (POS) at a mobile device. Emulation of the POS at the mobile device may include presenting, at the mobile device, emulation data corresponding to information captured at the POS. The emulation data presented at the mobile device may also correspond to information presented at a display device of the POS. The emulation data may be presented at the mobile device concurrently with the capturing of the corresponding information by the POS and/or the presentation of the corresponding information at the display device of the POS. The emulation data may be received and presented at the mobile device in real-time or near real-time based on network conditions or other factors related to a connection between the mobile device and the POS.

According to an aspect, a computer-readable storage device stores instructions that, when executed by a processor, cause the processor to perform operations. The operations include receiving information identifying a point of sale (POS) at a mobile device, and initiating a connection from the mobile device to the POS based on the information identifying the POS. The operations include receiving, at the mobile device via the connection, emulation data from the POS. The emulation data corresponds to information captured at the POS. The operations include emulating the POS at the mobile device based on the emulation data.

According to another aspect, a computer-readable storage device stores instructions that, when executed by a processor, cause the processor to perform operations. The operations include receiving information associated with a point of sale (POS) from a mobile device, and identifying the POS based on the information received from the mobile device. The operations include determining emulation data based on information captured at the POS., initiating transmission of the emulation data to the mobile device. The emulation data causes the mobile device to emulate the POS.

According to yet another aspect, a method includes receiving, by a processor, information associated with a point of sale (POS) from a mobile device, and identifying the POS based on the information received from the mobile device. The method includes generating, by the processor, emulation data descriptive of information captured at the POS. The method includes initiating, by the processor, transmission of the emulation data to the mobile device. The emulation data causes the mobile device to emulate the POS.

According to an additional aspect, an apparatus is disclosed and includes a processor, a communication interface communicatively coupled to the processor, and a memory coupled to the processor. The memory stores instructions that, when executed by the processor, cause the processor to perform operations. The operations include receiving information associated with a point of sale (POS) from a mobile device, and identifying the POS based on the information received from the mobile device. The operations include generating emulation data based on information captured at the POS identified by the information, and initiating transmission of the emulation data to the mobile device via the communication interface. The emulation data causes the mobile device to emulate the POS.

The foregoing has outlined rather broadly the features and technical advantages of the present invention in order that the detailed description of the invention that follows may be better understood. Additional features and advantages of the invention will be described hereinafter which form the subject of the claims of the invention. It should he appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
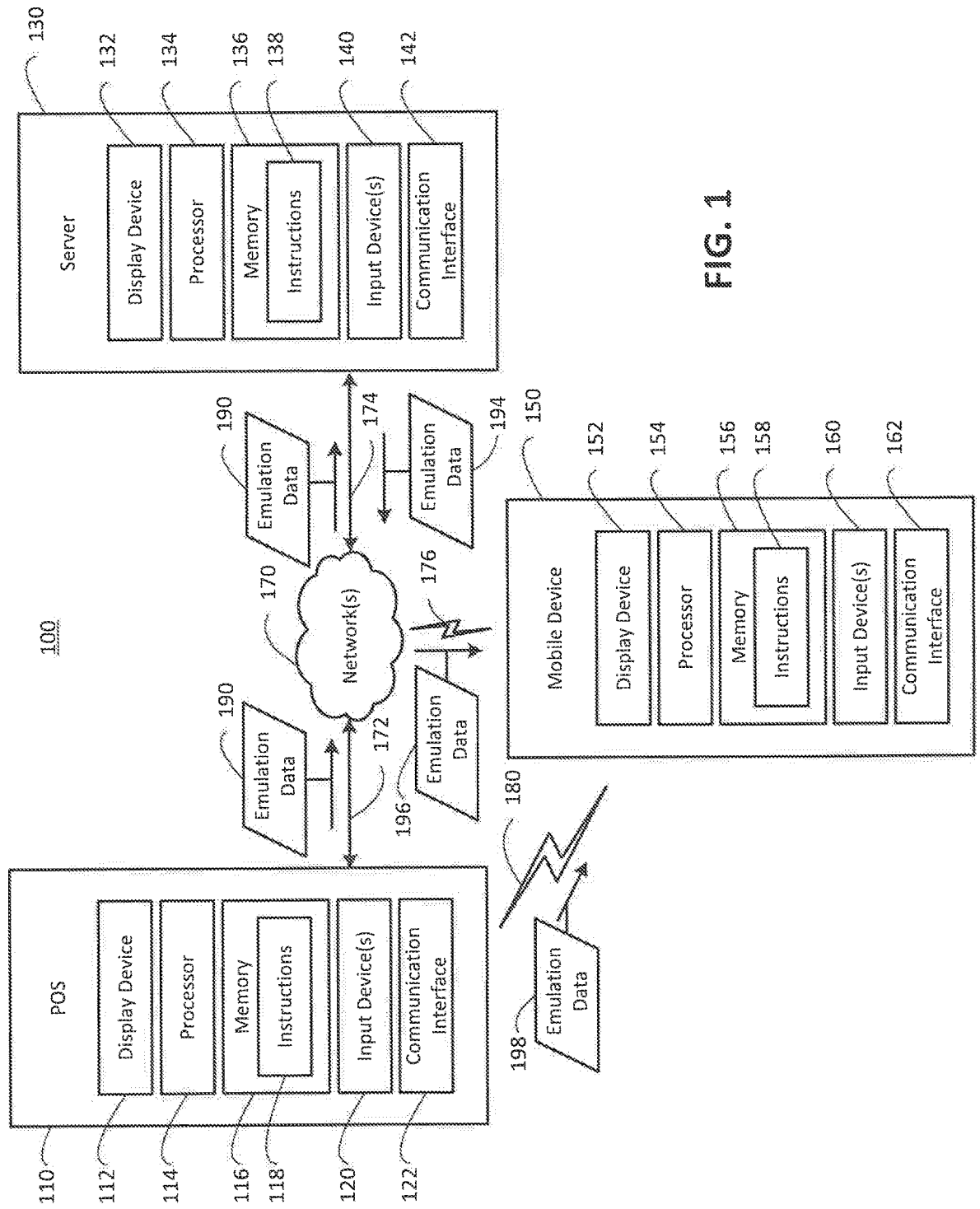
FIG. 1 is a block diagram illustrating aspects of an exemplary system configured to emulate a point of sale (POS) at a mobile device.

Referring to FIG. 1, a block diagram illustrating aspects of a system configured to emulate a point of sale (POS) at a mobile device is shown. As shown in FIG. 1, the system may include a POS 110, a server 130, and a mobile device 150. The mobile device 150 may be a smartphone, a tablet computing device, a laptop computing device, a personal digital assistant (PDA) device, or another electronic device having a wireless communication capability.

The POS 110 includes a display device 112, a processor 114, a memory 116, one or more input devices 120, and a communication interface 122. The memory 116 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 116 may store instruction 118 that, when executed by the processor 114, cause the processor 114 to perform operations described in connection with the POS 110 with reference to FIGS. 1-5.

The one or more input devices 120 may include a keyboard, a barcode scanner, a numeric keypad, a weight sensor, a radio frequency identification (RFID) device, a financial card reader, a combination of these input devices, or other types of input devices, such as a device configured to read information stored on a recordable medium (e.g., a compact disk (CD), a re-writable CD, a digital video disc (DVD), a re-rewritable DVD, etc.). For example, in a grocery store setting, the one or more input devices 120 of the POS 110 may include each of these types of input devices. As another example, the POS 110 may be integrated with a fuel pump at a fueling station and the one or more input devices 120 may include the financial card reader, the keyboard and/or the numeric keypad (e.g., for providing inputs such as a zip code, a personal identification number (PIN), designating a financial transaction as a debit transaction or a credit transaction, selecting additional services, such as a carwash, etc.), and one or more sensors for detecting or determining an amount of fuel dispensed, but may not include the barcode seamier, the RFID device, and the weight sensor. Thus, it is to be understood that the one or more input devices 120 may include any combination of input devices depending on a particular configuration and application of the POS 110.

The display device 112 may be a liquid crystal display (LCD) device, a light emitting diode (LED) device, a cathode ray tube (CRT) device, a segment display device, a plasma display panel (PDP) device, or another type of display device. In an aspect, the display device 112 may also be an input device (e.g., one of the one or more input devices 120). For example, the display device 112 may include a touchscreen capability. A user of the PDS 110, such as an employee of a grocery store, may utilize the touchscreen capability to provide an input to the POS 110, such as when a barcode cannot be read by the barcode scanner of the POS 110. As another example, the fuel pump may include the display device 112 having the touchscreen capability, and a consumer may utilize the touchscreen capability to select a particular grade of fuel (e.g., 87 octane fuel, 89 octane fuel, or 93 octane fuel) and/or provide additional inputs (e.g., a zip code, a PIN number, purchase a carwash, etc.).

In yet another aspect, the POS 110 may include multiple display devices 112. For example, when the POS 110 is integrated with the fuel pump, the display devices 112 may include a first display device (e.g., a first segment display) for displaying information associated with a total number of units (e.g., liters or gallons) of fuel dispensed, a second display device (e.g., a second segment display) for displaying information associated with a total sales price for the dispensed fuel, and a third display device (e.g., a third segment display) for displaying information associated with a price per unit (e.g., a price per liter or a price per gallon) for a selected type of fuel. Alternatively, a single display device (e.g., an LED display device, an LCD display device, etc.) may be used to present the information associated with the total number of units of fuel dispensed, the information associated with the total sales price for the dispensed fuel, and the information associated with the price per unit for the selected grade of fuel. Thus, it is to be understood that the display device 112 may include any combination of display devices depending on a particular configuration and application of the POS 110.

The communication interface 122 may be configured to communicatively couple the PDS 110 to one or more networks, such as a network 170, as shown in FIG. 1. The communication interface 122 may be configured to communicatively couple the PDS 110 to the network 170 via a connection 176. The connection 172 may be a wired connection established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ generation (3G) protocol, a $4^{th}$ generation (4G)/long term evolution (LTE) protocol, etc.).

The network 170 may be a wired network, a wireless network, or may include a combination of wired and wireless networks. For example, the network 170 may be a local area network (LAN), a wide area network (WAN), a wireless WAN, a wireless LAN (WLAN), a metropolitan area network (MAN), a wireless MAN network, a cellular data network, a cellular voice network, the internet, etc. Additionally, the network. 170 may include multiple networks operated by different entities. For example, the network 170 may include a first network (e.g., a payment processing network, a banking network, etc.) operated by a first network operator (e.g., a financial card payment processing entity, a credit card company, a bank, etc.) and a second network (e.g., a LAN, WAN, WLAN, wireless WAN, etc.) operated by a second operator (e.g.,, a grocery store, an operator of a chain of grocery stores, a fueling station, an operator of a chain of fueling stations, etc.).

The POS 110 may be a POS terminal, such as may be located at a checkout counter at a grocery store, a convenience store, etc., or may be integrated with another device, such as a fuel pump at a fueling station or a self-serve kiosk located at an airport, a train station, a shopping mall, etc. In an aspect, the POS 110 may be part of a POS system that may include multiple POSs 110. The network 170 may include a POS network that may be communicatively coupled to one or more external networks (e.g., a financial network, a banking network, a payment processing network, a loyalty rewards network, a merchant services network, a gift card network, a pre-paid financial card network, etc.). In an aspect, the POS network may include the one or more external networks. In an additional or alternative aspect, the POS network may include one or more devices that are configured to communicate with particular ones of the one or more external networks, such as a financial transaction server that is configured to communicate with the financial network, the banking network, the payment processing network, the merchant services network, the gift card network, the pre-paid financial card network, etc. to process payment information associated with a financial account, a financial card (e.g., a debit card, a credit card, a gift card, a pre-paid financial card, etc.), etc.

The POS network may provide the POS 110 with access to the one or more external networks for processing payment information, discount information, loyalty reward information, etc. (e.g., processing or validating check payments, processing debit card transactions, processing credit card transactions, processing loyalty rewards information, processing gift card transactions, processing pre-paid financial card transactions, processing coupons, processing promotional offers, etc.). In some aspects, the POS 110 may have direct access to the one or more external networks and may directly process the payment information, the discount information, the loyalty reward information, etc. In still other additional or alternative aspects, the POS 110 may process the payment information, the discount information, the loyalty reward information, etc. without being connected to the one or more external networks. In an additional aspect, the POS 110 may be configured to process other forms of payment information, such as payments made using an electronic wallet, payments made using PayPal™, etc. and may be communicatively coupled, either directly or indirectly (e.g., through the POS system and the POS network) to an external network that facilitates processing of such payment.

The POS 110 may communicate with the server 130 via the connection 172 to the network 170. As shown in FIG. 1, the server 130 includes a display device 132, a processor 134, a memory 136, one or more input devices 140, and a communication interface 142. The memory 136 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 136 may store instructions 138 that, when executed by the processor 134, cause the processor 134 to perform operations described in connection with the server 130 with reference to FIGS. 1-5.

The one or more input devices 140 may include a keyboard, a mouse, a device configured to read information stored on a recordable medium (e.g., a compact disk (CD), a re-writable CD, a digital video disc (DVD), a re-rewritable DVD, etc.), other types of input devices, or a combination of these types of input devices. The display device 132 may be a liquid crystal display (LCD) device, a light emitting diode (LED) device, a cathode ray tube (CRT) device, a segment display device, a plasma display panel (PDP) device, or another type of display device. In an aspect, the server 130 may not include the display device 132 and/or the one or more input devices 140.

The communication interface 142 may be configured to communicatively couple the server 130 to one or more networks, such as the network 170, as shown in FIG. 1. The communication interface 142 may be configured to communicatively couple the server 130 to the network 170 via a connection 174. The connection 174 may be a wired connection or a wireless connection, and may established according to one or more communication protocols or standards, as described with reference to the communication interface 122.

As shown in FIG. 1, the mobile device 150 includes a display device 152, a processor 154, a memory 156, one or more input devices 160, and a communication interface 162. The memory 156 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 116 stores instructions 158 that, when executed by the processor 154, cause the processor 154 to perform operations described in connection with the mobile device 150 with reference to FIGS. 1-5.

The one or more input devices 160 may include a keyboard, numeric keypad, control buttons (e.g., a select button, a back button, etc.), other types of input devices, or a combination of these types of input devices. The display device 132 may be a color super twisted nematic (CSTN) display device, a thin film transistor (TFT) display device, a thin film diode (TFD) display device, an organic light emitting diode (OLEO) display device, an active matrix organic light emitting diode (AMOLE) display device, an in plane switching liquid crystal display (IPS-LCD) display device, or another type of display device. In an aspect, the display device 152 may also be an input device (e.g., one of the one or more input devices 160). For example, the display device 152 may include a touchscreen capability, and a user of the mobile device 150 may provide commands and/or inputs to the mobile device 150 using the touchscreen capability.

The communication interface 162 may be configured to communicatively couple the mobile device 150 to one or more networks, such as the network 170, as shown in FIG. 1. The communication interface 162 may be configured to communicatively couple the server 130 to the network 170 via a connection 176. The connection 176 may be a wireless connection established according to one or more communication protocols or standards (e.g., a 3G protocol, a 4G/ LTE protocol, etc). In an aspect, the connection 176 may be established via multiple networks. For example, the communication interface 162 may communicatively couple the mobile device 150 to a cellular voice network and/or a cellular data network, and the connection 176 may be established with the network 170 via a connection to the cellular voice network and/or a connection to the cellular data network. In another aspect, the mobile device 150 may be coupled to the network 170 via a wireless fidelity (Wi-Fi) connection. Other methods of communicatively coupling the mobile device 150 to the network 170 may be used, and are not described herein in order to simplify this disclosure. Thus, the present disclosure is not to he limited to the specific illustrative examples provided herein.

In some aspects, the server 130 may be part of a POS system and may be communicatively coupled to a POS network (e.g., included in the network 170) that couples the server 130 to multiple POSs 110. For example, the server 130 may be an enterprise level server of a merchant (e.g., a grocery store or a chain of grocery stores) and may be located proximate to the POSs 110 (e.g., at a same store location as the POSs 110) or may be located remotely from the POSs 110 (e.g., at a corporate headquarters, a particular store location among multiple store locations including POSs 110, etc.). The POS network that may communicatively couple the server 130 to one or more external networks (e.g., a financial network, a banking network, a payment processing network, a loyalty rewards network, a merchant services network, a gift card network, a prepaid financial card network, etc.). In an aspect, the POS network may include the one or more external networks. In an additional or alternative aspect, the POS network may include one or more devices, which may include the server 130, that are configured to communicate with particular ones the one or more external networks, such as a financial transaction server that is configured to communicate with the financial network, the banking network, the payment processing network, the merchant services network, the gift card network, the pre-paid financial card network, etc. to process payment information associated with a financial account, a financial card (e.g., a debit card, a credit card, a gift card, a prepaid financial, card, etc.), etc.

The POS network may provide the server 130 with access to the one or more external networks for processing payment information, discount information, loyalty reward information, etc. (e.g., processing or validating check payments, processing debit card transactions, processing credit card transactions, processing loyalty rewards information, processing gift card transactions, processing pre-paid financial card transactions, processing coupons, processing promotional offers, etc.). In some aspects, the server 130 may have direct access to the one or more external networks and may directly process the payment information, the discount information, the loyalty reward information, etc. In still other additional or alternative aspects, the server 130 may process the payment information, the discount information, the loyalty reward information, etc. without being connected to the one or more external networks. In an additional or alternative aspect, the server 130 may be coupled to the POS network and the one or more external networks for processing the payment information, the discount information, the loyalty reward information, etc. (e.g., based on information received from the POS 110, from the mobile device 150, another device, or a combination thereof). In an additional aspect, the server 130 may be configured to process other forms of payment information, such as payments made using an electronic wallet, payments made using PayPal™, etc. and may be communicatively coupled, either directly or indirectly (e.g., through the POS system and the POS network) to an external network that facilitates processing of such payment methods.

During operation, the POS 110 may receive input from the one or more input devices 120. For example, in a grocery store setting, a consumer associated with the mobile device 150 may initiate a consumer transaction by placing products that the consumer desires to purchase on a conveyor belt or other area of a checkout counter, and a cashier or other employee of the grocery store may provide inputs that identify the products to the POS 110. This may include using the barcode scanner (e.g., one of the one or more input device 120) to read barcodes provided on packaging of the products. Each of the barcodes may include information (e.g., a price, a description of a product, a product identifier, etc.) associated with a particular product.

For example, a first product may include a first label and a second product may include a second label. A first barcode storing first information associated with the first product may be printed on the first label and a second barcode storing second information associated with the second product may be printed on the second label. The first information and the second information may include a price of the first product and the second product, respectively, a description of the first product and the second product, respectively, and/or other information. In some aspects, the first and second barcodes may only include a product identifier of the first product and the second product, respectively. In this aspect, the POS 110 may communicate the product identifiers to the server 130 via the network 170, and the server 130 may then process the product identifiers and provide the first information and the second information to the POS 110 via the network 170.

As the inputs associated with the products are provided to the POS 110, information associated with the products may be displayed at the display device 112 of the POS 110. For example, as each of the products is scanned by the barcode reader, the description of the product and the price of the product may be displayed on the screen. At some point, either before or during the consumer transaction, the consumer may provide an input (e.g., using one of the one or more input devices 160) to the mobile device 150. The input may correspond to a request to emulate the POS 110 at the mobile device 150 and may include information identifying the POS 110, in an aspect, a quick response (QR) code (or other type of barcode) may be provided proximate to the POS 110 and the consumer may use an imaging device (e.g., a built in camera module of the mobile device 150 not shown in FIG. 1) of the mobile device 150 to scan the QR code. The QR code may include the information identifying the POS 110. In another aspect, a label may be provided proximate to the POS 110 and may include the information identifying the POS 110. The information identifying the POS 110 may include an identifier (e.g., a number, text, etc.) that uniquely identifies the POS 110. The consumer may provide the information identifying the POS 110 to the mobile device 150, such as via a user interface presented at the display device 152 of the mobile device 150. In some aspects, the mobile device 150 may receive the information identifying the POS 110 via an RFID device integrated with or coupled to the mobile device 150. For example, an RFID tag may be positioned proximate to the POS 110 and may transmit a signal that includes the information identifying the POS 110. Other methods of receiving the information identifying the POS 110 may also be used and the present disclosure is not to be limited to the specific illustrative examples provided herein.

In an aspect, the input including the information identifying the POS 110 may be provided to the mobile device 150 using an application being executed at the mobile device 150 by the processor 154). For example, an operator of the grocery store may create the application and make the application available from an application store. The consumer may download the application to the mobile device 150 using the communication interface 162. The application may be stored as instructions, such as the instructions 158. In response to the input corresponding to the request to emulate the POS 110 at the mobile device 150, the application may initiate a connection from the mobile device 150 to the POS 110. The connection may initiated based, at least in part, on the information identifying the POS 110. In an aspect, the connection may be established via a connection to the network 170, such as the connection 176. In another aspect, the connection may be a direct connection to the POS 110, such as a connection 180, as shown in FIG. 1. The connection 180 may be established using a short-range wireless communication protocol (e.g., a Bluetooth protocol, a near field communication protocol, etc.), using peer-to-peer communication, using an ad-hoc network, or another method for establishing a wireless communication link.

The POS 110 may receive the information associated with the POS 110 from the mobile device 150. In an aspect, the application being executed at the mobile device 150 may include information for facilitating the connection to the POS 110. For example, when the connection is the direct connection, the application may include information associated with how the connection should be established (e.g., using Bluetooth, using peer-to-peer communication, using the ad-hoc network, etc.). The application may also include information for encrypting and decrypting information communicated between the POS 110 and the mobile device 150. In some aspects, only particular types of information are encrypted, such as information associated with payment information.

In some aspects, the server 130 may receive the information associated with the POS 110 from the mobile device 150, and may detect that the information corresponds to the request to emulate the POS 110. The server 130 may identify the POS 110 based on the information received from the mobile device 150.

Furthermore, instead of providing information identifying the POS 110 to the mobile device 150, one or more aspects of the present disclosure provide for initiating emulation of the POS 110 by identifying the mobile device 150 to the POS 110. For example, the mobile device 150 may include the application for emulating the POS 110. The application may be associated with a user account. For example, the user of the mobile device 150 may register with a provider of the application (e.g., an operator of the grocery store, a third party promoter, etc.) and create a profile that may be stored at a server (e.g., the server 130 or another device not shown in FIG. 1). The profile may include information that identifies the mobile device 150, such as a telephone number associated with the mobile device 150, an international mobile subscriber identity (IMSI) associated with the mobile device 150, etc. In response to the user prompting the application to initiate emulation of the POS 110, the application may present information (e.g., a barcode, a QR code, etc.) at the display device 152 of the mobile device 150 that may be scanned using the barcode scanner of the POS 110. The scanning of the information presented at the display device 152 may signal to the POS 110 (or the POS system, the POS network, the server 130, etc.) that the user associated with the mobile device 150 is requesting to emulate the POS 110 at the mobile device 150. The POS 110 (or the POS system, the POS network, the server 130, etc.) may access the profile associated with the user and determine information identifying the mobile device 150 based on the profile. Subsequently, the POS 110 (or the POS system, the POS network, the server 130, etc.) may initiate emulation of the POS 110, as described in more detail below, based on the information identifying the mobile device 150 determined using the profile. As another example, the mobile device 150 may utilize a wireless connection (e.g., RFID, Bluetooth, etc.) to provide the information that identifies the mobile device 150 to the POS system 110, and the POS system 110 (or the POS system, the POS network, the server 130, etc.) may then access the profile associated with the user and initiate the emulation of the POS 110 at the mobile device 150, as described in more detail below.

After establishing the connection between the mobile device 150 and the POS 110, the server 130, or both, emulation of the POS 110 at the mobile device may begin. For example, the POS 110 (or the server 130) may determine emulation data. The emulation data may be determined based on the information captured at the POS 110 (e.g., using the one or more input devices 120). When the mobile device 150 is communicatively coupled to the POS 110 directly via the connection 180, the POS 110 may provide the emulation data to the mobile device 150 as emulation data 198, as shown in FIG. 1. When the mobile device 150 is communicatively coupled to the POS 110 via the network 170, the POS 110 may provide the emulation data to the network 170 via the connection 172 as emulation data 190, as shown in FIG. 1, and the mobile device 150 may receive the emulation data 190 from the network 170 via the connection 176 as emulation data 196. In an aspect, the emulation data 190 and the emulation data 196 may be the same emulation data.

When the mobile device 150 is communicatively coupled to the server 130, the POS 110 may provide the emulation data 190 to the server 130 via the connections 172, 174 to the network 170, as shown in FIG. 1. The server 130 may generate and store a transaction log (not shown in FIG. 1) associated with the emulation data 190. The transaction log may record information associated with each product purchased at the POS 110. The server 130 may then provide the emulation data to the network 170 via the connection 174 as emulation data 194, as shown in FIG. 1, and the mobile device 150 may receive the emulation data 194 from the network 170 via the connection 176 as emulation data 196. In an aspect, the emulation data 190 provided from the POS 110 to the server 130 and the emulation data 194/196 provided from the server 130 to the mobile device 150 may be the same emulation data. In another aspect, the emulation data 190 provided to the server 130 and the emulation data 194/196 provided from the server 130 to the mobile device 150 may be different emulation data. For example, the emulation data 190, when provided from the POS 110 to the server 130, may include additional information, such as performance metrics (e.g., average number of items scanned per minute, whether any items were voided during the consumer transaction, etc.) associated with the employee operating the POS 110, status information regarding one or more components of the POS 110, etc., which may be unrelated to the information associated with the products to be purchased by the consumer associated with the mobile device 150. The server 130 may filter the additional information from the emulation data 190, such that the emulation data 194/196 provided from the server 130 to the mobile device 150 only includes the information associated with the products to be purchased by the consumer.

The emulation data 196/198 may be configured to cause the mobile device 150 to emulate the POS 110. For example, as the information associated with the products to be purchased by the consumer is input into the POS 110, the information associated with the products may be presented at the display device 112. For example, when the information associated with the first product is input into the POS 110, the description of the first product and the price of the first product may be presented at the display device 112. Information associated with additional products may be presented at the display device 112 as inputs associated with the additional products are received at the POS 110. The information presented at the display device 112 may also include additional information, such as a running sub-total, a running amount of tax, and a running total which may be dynamically updated as the inputs for each of the products is received at the POS 110.

Emulating the POS 110 at the mobile device 150 may include presenting information descriptive of each of the products to be purchased by the consumer at the display device 152. During the emulation of the POS 110, the information presented at the display device 152 may mirror or otherwise correspond to the information presented at the display device 112 of the POS 110 during the consumer transaction. For example, in response to receiving emulation data associated with the first product, the mobile device 150 may present information corresponding to the sales price of the first product at the display device 152. The emulation data may also include the description of the first product, which may be presented in association with the sales price of the first product.

In an aspect, the emulation data may include information associated with a current value of the sub-total, a current value of the tax, and a current value of the total, where the term "current," in this context, refers to the value of the respective pieces of information when the emulation data was generated. In an additional or alternative aspect, the application being executed at the mobile device 150 may dynamically determine the current value of the sub-total, the current value of the tax, and the current value of the total based on the information (e.g., the description and/or the price, etc.) included in the emulation data received at the mobile device 150. For example, the application may be configured to determine whether products indicated by the emulation data are taxable items (e.g., clothing, appliances, etc.) or non-taxable items (e.g., food) and to update the current value of the sub-total, the current value of the tax, and the current value of the total accordingly.

The information captured at the POS 110 may change periodically as information corresponding to each of the products is captured at the POS 110. The POS 110 may be configured to periodically provide the emulation data to the mobile device 150 and/or the server 130 in response to changes in the information captured at the POS 110. For example, the POS 110 may generate and transmit the emulation data every time an input associated with a product is received. Alternatively or additionally, the POS 110 may be configured to generate and transmit the emulation data at a desired frequency. For example, the POS 110 may generate and transmit the emulation data a particular number of times over a time period (e.g., 10 times per minute). In some aspects, the POS 110 may transmit the cumulation data 190 to the server 130 after each input is received. The server 130 may then generate and transmit the emulation data 194 at the desired frequency, or may generate and transmit emulation data 194 each time the emulation data 190 is received. Thus, the POS 110 and/or the server 130 may dynamically generate updated emulation data based on the information captured at the POS 110. The updated emulation data may be provided to the mobile device 150. The updated emulation data may be configured to cause the emulation of the POS 110 at the mobile device 150 to be dynamically updated during the consumer transaction. The emulation data may be provided to the mobile device 150 in real-time or near real-time depending on whether the connection is a direct connection (e.g., the connection 180) or an indirect connection (e.g., the connection 176). For example, when the connection is the direct connection, the emulation data may be provided to the mobile device 150 in real-time. When the connection is the indirect connection, the emulation data may be provided in real-time or near real-time based upon network conditions (e.g., a number of transactions communicated over the network 170, a number of other POSs 110 or other mobile devices 150 coupled to the network 170, etc.) associated with the network 170 and/or based upon a volume of transactions being processed by the server 130 (e.g., when the emulation data is provided to the mobile device 150 from the server 130). Additional illustrative aspects of generating and providing the emulation data and the updated emulation data to the mobile device 150, and emulating the POS 110 at the mobile device 150 using the emulation data and the updated emulation are described with reference to FIGS. 2 and 3.

In an aspect, the POS 110 may receive payment information. The payment information may be associated with a financial card (e.g., a debit card, a credit card, a prepaid financial card, or a gift card), loyalty rewards (e.g., loyalty rewards points, loyalty rewards discounts, loyalty rewards credits, etc.), financial account information (e.g., bank account and routing number information read from a check). The payment information may be received at the POS 110 using one of the one or more input devices 120. For example, the financial card reader may read a magnetic stripe of the financial card, or the barcode scanner may scan a barcode included on the financial card. The POS 110 may initiate a financial transaction based on the payment information. The financial transaction may charge an amount to a financial account associated with the financial card. The amount charged to the financial account may correspond to a total sales price for a consumer transaction, or may be less than the total sales price if multiple methods of payment are used (e.g., the financial card is used after applying the gift card, coupons, redeemed loyalty rewards, cash, etc.).

In an additional or alternative aspect, the payment information may be determined at the mobile device 150, and the financial transaction may be initiated at the mobile device 150 based on the payment information. As an example, the mobile device 150 may prompt the user to select a method of payment. In an aspect, this may include emulating one or more devices coupled to or integrated with the POS 110, such as a financial card reader. The application executing at the mobile device 150 may prompt the user to select the method of payment by displaying one or more icons within the graphical user interface of the application. The icons may include an icon for indicating payment will be made using cash, an icon indicating payment will be made using a credit card, an icon indicating payment will be made using a gift card, an icon indicating payment will be made using loyalty rewards, an icon indicating payment will be made using a check, an icon indicating payment will be made using a debit card, etc. The user of the mobile device 150 may select one of the icons to designate a particular form of payment to be used. For example, selection of the credit card payment icon may enable the user to select a credit card provided by a particular credit card provider for use in paying for the transaction. Additional icons may be presented within the user interface of the application to facilitate the selection of the credit card. Furthermore, the application may enable the user to indicate whether the entire amount of the transaction (e.g., a total sales price) is to be processed using the credit card, or whether multiple payment methods are to be made (e.g., using the credit card for a first portion of the entire amount of the transaction and using one or more other forms of payment for the remainder of the entire amount of the transaction. The icons for selecting the method of payment may further include an icon that indicates payment will be made via the POS 110, such as by swiping a financial card at the financial card reader of the POS 110, by cash, etc.

In response to a selection of a method of payment icon corresponding to a method of payment other than a cash payment or as payment via the POS 110, the mobile device 150 may initiate the financial transaction by transmitting the payment information from the mobile device 150 to the POS 110 via the connection 180 or the connection 176. The payment information may be received at the POS 110 from the mobile device 150, and the POS 110 may process the payment information as if the payment information had been received using the financial card reader or the barcode scanner. As another example, the mobile device 150 may initiate the financial transaction by processing the payment information at the mobile device 150. The processing of the payment information may charge the financial account associated with the financial card. In an aspect, the application being executed at the mobile device 150 may include information for communicatively coupling the mobile device 150 to a financial network that may process the payment information. In an aspect, the payment information is determined by the mobile device 150 based on financial card information stored at the memory 156 of the mobile device 150. In an additional or alternative aspect, the payment information is determined by the mobile device 150 based on information read from a financial card using a financial card reader device (not shown in FIG. 1) coupled to the mobile device 150. When the financial transaction is initiated and processed at the mobile device 150, the mobile device 150 may transmit information indicating completion of the processing of the financial transaction (e.g., a credit card authorization number, etc.) to the POS 110 via the connection 180 or the connection 176.

When the financial transaction is initiated and processed at the mobile device 150, the application being executed by the mobile device 150 may generate a receipt that includes the information included in the emulation data received from the POS 110, and may store the receipt at the memory 156 of the mobile device 150. When the financial transaction is processed at the POS 110, the POS 110 may generate an electronic receipt and transmit the electronic receipt to the mobile device 150. The POS 110 may also generate a paper receipt if the consumer associated with mobile device 150 so desires. The server 130 may further be configured to generate electronic receipts in lieu of, or in addition to providing paper receipts generated by the POS 110.

In some aspects, the electronic receipt may be stored at a memory external to the memory 156 of the mobile device 150 or provided to a destination other than the mobile device 150. For example, the POS 110, the server 130, or the application executing on the mobile device 150 may cause the receipt to be provided to an email address. The email address may be determined based on the profile associated with the user of the mobile device 150. As another example, the user may access the receipt using a website provided by a provider of the application being executed at the mobile device 150. The website may provide the user with access to purchase history information, a receipt log that includes receipts for all transactions made by the user, and other information, as described elsewhere herein (e.g., purchasing trend information, electronic coupons, special offers, limited time offers, etc.). As another example, the receipt may be provided to an electronic wallet associated with the user of the mobile device 150, or other electronic payment provider, and may be accessed by the user of the mobile device 150 using an account associated with the electronic wallet or the other electronic payment provider.

In addition to generating receipts (e.g., paper or electronic receipts), the application, the POS 110, or the server 130 may generate and provide electronic coupons. The electronic coupons may be provided in lieu of, or in addition to paper coupons provided to the user by the POS 110 (e.g., using a coupon printer coupled to the POS 110). The electronic coupons may be provided prior to completion of the transaction (e.g., prior to payment) and the user, via interaction with the user interface of the application, may apply the electronic coupons to the transaction. Applying the electronic coupons to the transaction may reduce a total sales price of the transaction. Additionally or alternatively, the user may elect to not apply the electronic coupons during the transaction. In such instances the user may manipulate inputs provided via the graphical user interface of the application to store the electronic coupons at the memory 156 of the mobile device 150, or at another memory (e.g., a memory storing the user's profile, an electronic wallet account, an email, etc.). Some of the electronic coupons may only be valid for use during a subsequent transaction (e.g., a subsequent visit to the grocery store or other retail location) and the user may store those coupons for subsequent use. For example, the application may store the electronic coupons at the memory 156 of the mobile device 150, or at another memory (e.g., a memory storing the user's profile, an electronic wallet account, an email, etc.). The application may prompt the user as to whether the user would like to apply one or more of the electronic coupons during a subsequent transaction. Additionally, the application may prompt the user when one or more of the electronic coupons are about to expire. In an additional or alternative aspect, paper coupons may be scanned (e.g., using an imaging capability of the mobile device 150) using the application and converted to electronic coupons for subsequent use as electronic coupons. The electronic coupons generated by scanning paper coupons may be stored at the memory 156 of the mobile device 150 or may be transmitted to another device (e.g., the server 130) where the electronic coupons may be stored in association with the user or a profile of the user.

The receipts stored at the memory 156 may be subsequently accessed and viewed by the consumer using the application being executed at the mobile device 150. In an aspect, the application may be configured to analyze the receipts stored at the memory 156 and provide information to the POS 110 and/or the server 130. The information provided to the POS 110 and/or the server 130 may include purchasing trends associated with the consumer, such as brands associated with products that consumer frequently purchases, how frequently the consumer makes purchases at the store where the POS 110 is located, or stores affiliated with the store where the POS 110 is located, such as another store that is part of a chain of retail stores, and other information associated with purchasing trends of the consumer. The POS 110 and/or server 130 may utilize the information to target advertisements to the consumer.

To illustrate, during the emulation of the POS 110 at the mobile device 150, the application may transmit information associated with the purchasing trends of the consumer to the POS 110 and/or the server 130. In response to receiving the purchasing trends information, the POS 110 and/or the server 130 may transmit promotion information to the mobile device 150. The promotion information may be associated with an advertisement for a product, a service, or both, and may be determined based on the information received from the application. According to some aspects, the promotion information may be determined by the server 130 based on information captured at the POS 110 during the consumer transaction. The mobile device 150 may present the advertisement at the mobile device 150. The advertisement may be presented as a graphical overlay with respect to the information presented at the mobile device 150 during the emulation of the POS 110, or a region of a user interface of the application may be reserved for presenting the advertisement. For example, the information presented based on the emulation data may be positioned within a first region of the user interface and a second region may be used to present advertisements.

Additionally or alternatively, the promotion information may also be associated with a discount (e.g., an electronic coupon) for one or more products, one or more services, or a combination thereof. The discount may be determined by the POS 110 and/or the server 130 based on the information captured at the POS 110. The discount may be reflected at the mobile device 150 by reducing a current total sales price for the transaction. Additionally, the mobile device 150 may present the discount at the display device 152, and the user of the mobile device 150 may elect to apply the discount or may elect to not apply the discount by selecting one or more icons presented within the user interface of the application. When the user elects to not apply the discount, the application may automatically store information associated with the discount at the memory 156 of the mobile device for subsequent use by the user, or may prompt the user as to whether the user desires to store the discount information for subsequent use.

In an aspect, the discount may be an electronic coupon generated at the mobile device 150. For example, the consumer may use the application to scan each of the products prior to presenting the products at the checkout counter. In some aspects, the application may utilize a global positioning system (GPS) capability of the mobile device 150 to determine a location of the store where the consumer (e.g., the user of the mobile device 150) is located and may establish the connection to the server 130. As the products are scanned, a price of the product may be presented at the user interface of the application. In some aspects, the user may capture an image of the price of the product, such as a pricing tag or label on a shelf where the product is displayed for sale. This may be useful when the price presented in response to scanning the item differs from the price of the product as reflected on the pricing tag of the label. During checkout, the user of the mobile device 150 may retrieve the image and present it to the cashier to ensure that the user is charged the appropriate amount for the product.

Additionally, as the products are scanned the application may cause the mobile device 150 to transmit information to the server 130 indicating each of the products and, when the products are associated with a coupon, the server 130 may transmit the coupon to the mobile device 150. The application may then store the coupons and, in response to receiving the input requesting to emulate the POS 110, may transmit the coupons to the POS 110. In some aspects, the server 130 may not transmit the coupons to the mobile device 150, and instead may automatically provide the coupons to the POS 110 (e.g., in response to detecting the request to emulate the POS 110 at the mobile device 150). The POS system 110 may then print the coupons using a coupon printer coupled to the POS 110, or may automatically apply the coupons to the transaction. In another additional or alternative aspect, the coupons may be applied automatically from the mobile device 150 irrespective of whether payment is made from the mobile device 150 or at the POS 110.

Additionally, the server 130 may target one or more advertisements to the mobile device 150 while the consumer is selecting the products to be purchased (e.g., prior to the consumer checking out at a checkout counter). For example, the application may provide the consumer information associated with the consumer purchasing trends to the server 130, and the server 130 may determine one or more product recommendations based on the purchasing trends. Additionally, the server 130 may detect (e.g., based on the scanning of products using the mobile device 150, etc.) that the consumer is selecting products to be purchased, and may access consumer purchasing trend information stored at the server 130. In an aspect, the product recommendations may include recommendations for a different brand of a product that is cheaper than a brand of the product that the consumer frequently purchases, or that is associated with a coupon (e.g., when the brand of the product that the consumer frequently purchases is not associated with a coupon). In another aspect, the product recommendations may include recommendations for a product that is complementary to a product scanned by the consumer using the mobile device 150. For example, the consumer may be located in a suit department at a clothing store and may scan a suit. The server 130 may receive information indicating that the consumer has scanned the suit and may provide a product recommendation for a product that is complementary to the suit, such as a tie, a belt, a pair of shoes, etc. The product recommendations may include information to assist the consumer in locating the recommended product. For example, in the grocery store setting, the product recommendation may include an image of the recommended product and a location of the recommended product. The location may be indicated by indicating an aisle number where the product is located, a location on the aisle (e.g., halfway down the aisle on the second shelf from the bottom), etc. In an aspect, the location may be indicated by a map (e.g., a map of a store layout, a map of directions to a store, a map of a mall or shopping center, a map of an airport terminal, a map of a train station, etc.) presented via the application being executed on the mobile device 150.

In some aspects, the server 130 may provide offers to the mobile device 150. The offers may include offers that are available only to users who have the application installed on their respective mobile devices 150, and/or may include offers that are available to consumers who purchase particular products, combinations of products, or a threshold amount of a product. The offers may also include offers for products offered by a third party (e.g., cross-marketing offers). For example, a grocery store may provide and offer to the mobile device 150 for a product sold by another store (e.g., a home improvement store). In some aspects, the offers may be associated with a temporal aspect. For example, the offer may only be valid for a limited amount of time (e.g., one hour, one day, one week, etc.). In some aspects, the offers may require an additional purchase. For example, an offer may provide the user of the mobile device 150 with a discount (e.g., ten dollars off) during a subsequent visit to the store or a credit (e.g., an in-store credit, a credit to a financial account of the user, a quantity of loyalty rewards points, or loyalty rewards credits, or loyalty rewards discounts, a gift card, a prepaid financial card, etc.) if the user purchases a particular product at another store or spends a threshold amount at the other store.

When the offer requires the user to purchase a particular product at the other store, the user may initiate payment for the particular product prior to arriving at the other store. For example, the offer may be provided to the mobile device 150 while the user of the mobile device 150 is checking out at a grocery store. The offer may indicate that the user will receive a quantity of loyalty rewards points (or some other reward, discount, credit, etc.) if the user purchases a particular product at a home improvement store. The user may pay for the particular product from the home improvement store during a same financial transaction as payment for one or more products being purchased from the grocery store. In this example, the payment for the particular product and the payment for the one or more products of the grocery store may result in a single charge to a financial account or may result in separate charges to different financial accounts. Additionally, the user may use multiple forms of payment to complete the transaction. Payment processing systems or networks (e.g., banking networks, financial card networks, loyalty rewards networks, gift card networks, pre-paid financial card networks, etc.) communicatively coupled to the POS 110 or integrated with a POS system or a POS network associated with the POS 110 may be configured to apportion the payment between the grocery store and the home improvement store. In an aspect, the grocery store may receive a fee in exchange for providing the offer to the mobile device 150. The fee may be earned by the grocery store for providing the offer, or may be earned when the consumer (e.g., the user of the mobile device 150) accepts the offer, or the fee may be higher when the consumer accepts the offer than when the offer is presented at the mobile device 150 and is not accepted by the consumer.

Additionally, the offer may be accepted subsequent to completion of payment for the one or more products at the grocery store. For example, the user of the mobile device 150 may accept the offer anytime by purchasing the product via the application, or by presenting the offer when checking out or otherwise purchasing the particular product at the home improvement store or at an online marketplace provided by an operator of the home improvement store. If the consumer provides payment for the particular product while remote from the home improvement store, a receipt generated by the application may be presented at the display device 152 of the mobile device 150 upon arriving at the home improvement store to pick up the particular product.

In an aspect, discounts or other payment reducing information may be determined based on the consumer's participation in a loyalty reward program. The mobile device 150 may determine loyalty reward program information (e.g., information that identifies the user of the mobile device 150 is a participant in one or more loyalty programs), and may initiate transmission of the loyalty reward program information from the mobile device 150 to the POS 110 and/or the server 130. In an aspect, the loyalty reward program information may be stored at the memory 156 of the mobile device 150. In another aspect, the application being executed by the mobile device 150 may prompt the user to enter a loyalty reward program identifier, such as a telephone number associated with a loyalty reward program account of the consumer. In an aspect, the application may store the loyalty reward program identifier provided by the user, and may automatically provide the loyalty program identifier to the POS 110 and/or the server 130 during subsequent consumer transactions. In additional or alternative aspects, the loyalty reward program identifier may be received at the POS 110 via one of the one or more input devices 120. In some aspects, the consumer may provide information associated with more than one loyalty reward program to the POS 110 using the mobile device 150 or using a peripheral device (e.g., the numeric keypad, the barcode scanner, etc.) coupled to the POS 110, or may apply more than one loyalty reward program to a transaction being processed from the mobile device 150.

In an aspect, the loyalty reward program may provide for full or partial payment with respect to the transaction. For example, the loyalty reward program may indicate a particular discount on one or more products being purchased by, the user of the mobile device 150 (e.g., one dollar ($1) off the total transaction sales price, one dollar ($1) off each of item "X," ten percent (10%) off the total transaction sales price, ten percent (10%) off each of item "X," etc.), and the total transaction sales price may be reduced to reflect the discount amount provided by virtue of the user's membership in the loyalty rewards program. In some aspects, discounts accrued by virtue of the user's membership in the loyalty rewards program may be selectively applied by the user. For example, the graphical user interface of the application may present information to the user indicating each available reward that the user is eligible to redeem, and the user may provide an input to the application to indicate whether the user desires to apply one or more of the eligible rewards or not. In some aspects, the application may prompt the user when rewards for which the user is eligible to redeem are about to expire. In additional or alternative aspects, the information associated with the eligible loyalty rewards may be presented or otherwise communicated to the user using the POS 110 or a peripheral device coupled to the POS 110. Thus, the user may utilize the application presented at the mobile device 150 and/or may interact with the POS 110 to provide loyalty reward program information and to apply one or more rewards that the user is eligible to redeem.

Although FIG. 1 has been primarily described with reference to a consumer transaction occurring at a retail establishment, such as a grocery store, one or more aspects of the present disclosure may be utilized in other settings. For example, the POS 110 may be associated with a fuel pump at a fueling station and the consumer transaction may be a fuel purchase. In this context, the information captured at the POS 110 may include information descriptive of an amount of fuel dispensed by the fuel pump during the fuel purchase, information descriptive of a total cost for the fuel purchase, a sales price per unit of fuel dispensed at the fuel pump during the fuel purchase, other information, or a combination thereof. The emulation data may cause the mobile device 150 to present information corresponding to the information captured at the POS 110 during the fuel purchase.

The application may further enable the consumer to activate the fuel pump prior to exiting the vehicle. For example, fuel pumps typically require the consumer to either pre-pay for the fuel to be dispensed inside the store or pre-authorize a purchase of a specific dollar amount. The pre-authorization of the purchase may include providing financial information to the fuel pump using a POS 110 integrated with the fuel pump (e.g., by inserting, a financial card into a financial card reader of the POS 110). According to an aspect, the consumer may use the application executing at the mobile device to pre-authorize the purchase of fuel. This may include authorizing a specific dollar amount of fuel to be purchased (e.g., twenty dollars of fuel) or may simply authorize the purchase up to a limit set by the POS 110 of the fuel pump, which is typically between seventy dollars to one hundred dollars. The application may further enable the consumer to select a particular grade of fuel to be purchased. The consumer may then exit the vehicle, insert a nozzle of the fuel pump into a fuel tank inlet of the vehicle, and initiate the dispensing of the fuel. The consumer may then re-enter the vehicle and wait for dispensing of the fuel to complete (e.g., when the specific dollar amount of fuel has been dispensed, when the tank is full and the pump shuts off, or when the limit set by the POS 110 of the fuel pump has been reached).

The consumer may then sign or otherwise authorize the charging of a financial account using the application and then exit the vehicle, remove the nozzle from the fuel tank inlet, and then return to the vehicle. A receipt for the fuel purchase may be generated at the mobile device 150, printed by the POS 110 of the fuel pump, or both. This may enable the consumer to initiate, monitor, and complete the fuel purchase from inside a vehicle, save inserting and removing the fuel pump nozzle from the fuel tank inlet of the vehicle. This may be beneficial on days with poor weather conditions (e.g., a hot day, a cold day, a rainy day, etc.). This may also increase the safety of the consumer depending on the location of the fueling station where the fuel pump is located, and provide health benefits to the consumer (e.g., by not being exposed to fuel fumes during the dispensing of the fuel.

The application may further enable the consumer to conduct additional transactions at the fueling station. For example, the application may enable the consumer to purchase a car wash, or may enable the consumer to enter a store portion of the fueling station to purchase products (e.g., coffee, soft drinks, food items, etc.). The cashier may associate the purchase of the products with the POS 110 of the fuel pump (e.g., by scanning information presented at the display device 152 of the mobile device 150, etc.), and the consumer may authorize payment for the products using the application executing on the mobile device 150 (e.g., upon completion of the dispensing of the fuel). Additionally, the application may target advertisements (e.g., discount on coffee for purchasing fuel) to the consumer or promotions (e.g., free coffee for purchasing a threshold amount of fuel) to entice the consumer to enter the store portion of the fueling station. This may increase sales at the fueling station because the customer may purchase additional items other than those for which a promotion is offered once the consumer has entered the store portion.

In some aspects of the system 100 of FIG. 1, the consumer may be prompted for authentication information. The authentication information may include a password, a PIN number, a fingerprint, a voice or speech sample, entry of a code provided via a short message service (SMS) message sent from an operator of the POS 110, an operator of the server 130, a provider of the financial card being used to pay for the consumer transaction, etc. The authentication information (e.g., the code included in the SMS message, etc.) may be sent to the mobile device 150 in response to the swiping of the financial card at the financial card reader coupled to the POS 110 or in response to selection of a particular payment method using the application executing at the mobile device 150. This may provide an additional level of security to consumer transactions.

In some aspects, the system 100 (e.g., the POS 110, the server 130, the application being executed at the mobile device 150, a financial network or a loyalty reward network communicatively coupled to the POS 110 or the server 130, etc.) may prompt the user for the authentication information based on a total cost associated with the consumer transaction. For example, consumer transactions less than a first threshold amount (e.g., one hundred dollars) may not require entry of authentication information, but consumer transactions over the first threshold amount may require entry of authentication information. Still further, the system 100 may require different types of authentication information based on different total costs associated with consumer transactions. For example, a PIN number may be required for consumer transactions in excess of the first threshold, but that are less than a second threshold, where the second threshold is greater than the first threshold. When the consumer transaction amount is in excess of the second threshold, a second type of authentication information (e.g., entry of a password, a code included in an SMS message, etc.) may be requested by the system 100 (e.g., either by the application executing on the mobile device 150, by the POS 110, the server 130, or another device). Thus, as the total cost for the consumer transaction increases, the consumer may be prompted for additional authentication information.

In an additional or alternative aspect, the system 100 may prompt the user to validate the form of payment, such as payment using a particular credit card, payment using a particular redeemed loyalty reward, payment using a check, payment using a gift card, payment using a pre-paid card, etc.). To illustrate, the user may elect to swipe a financial card at the financial card reader of the POS 110. During processing of the financial card, the user of the mobile device 150 may be prompted to validate that the user swiped the financial card at the POS 110. The validation may include entering a code at the POS 110 (e.g., using a numeric keypad) or entering the code via the application. Other forms of authentication information may be used to verify authorize processing of the financial card, such as entry a password, entry of a card verification value (CVV) number, etc. The password may be specific to the financial card and different financial cards may be authorized using different passwords created by the user. Alternatively or additionally, the password may be specific to the user and may be used to authorize multiple difference financial cards. Furthermore, validating the form of payment may be used with forms of payment other than financial cards, such payments by check.

In some aspects, the mobile device 150 may operate as a POS 110. For example, some financial transactions are not processed using a POS, such as valet parking. In such instances, the mobile device 150 may operate as a virtual POS 110 and may enable the user to provide payment and/or tip for valet parking. To illustrate, in a typical valet parking scenario, the user receives a ticket that includes a number or other identifier (e.g., a barcode, a QR code, etc.) that is used by valet parking personnel to associate the user's vehicle with the user. The number or the other identifier included on the ticket may be provided to the application at the mobile device 150 to provide payment for the valet parking. In some instances, the user may provide the information prior to returning to the area where the valet personnel are located. This may reduce an amount of time that the user must wait for their vehicle to be pulled around. For example, the application may enable the user to indicate an estimated amount of time before the user would like to pick up the user's vehicle or until the user will arrive to pick up the vehicle. Upon arriving at the area where, the valet parking personnel are located, the user may present a receipt generated at the mobile device 150 that indicates payment for the valet parking and an amount of any tip. In some instances, a venue that the user is visiting may pay fix the valet parking (e.g., in exchange for the consumer dining at a restaurant or spending a threshold amount) or may validate a parking ticket (e.g., at a parking garage), and the user may enter information (e.g., a code, etc.) as an input to the application to pay for the valet parking or the parking garage parking ticket. In the parking garage scenario, the user may view a running total parking fee for using the parking garage, which typically charges in time increments (e.g., six minutes, fifteen minutes, an hour, a day, etc.). Additionally, the user may pay for the parking garage parking ticket or the valet parking using a gift card, a pre-paid financial card, loyalty rewards, or cash, and the mobile device 150 may generate a receipt. This may be beneficial in some instances, where a receipt may be required, such as getting reimbursed by a company the user of the mobile device 150 works for.

As yet another example, the mobile device 150 may emulate a POS 110 to facilitate a purchase at a live auction or to facilitate a purchase from a television program, such as an infomercial or other televised shopping opportunity. In the live auction setting, the user may view live bid amounts, place bids, and pay for winning bids using the application executing at the mobile device 150. The user may be located at a same location as a location where the live auction is taking place or may be located remotely from the location where the live auction is taking place. In the television program setting, the user may purchase a product offered for sale during the televised shopping opportunity using the application executing at the mobile device 150. The application may be used in conjunction with assistance provided by a telephone operator through which the product may be purchased. For example, the application may enable the user to indicate a desired quantity of the product to be purchased, a configuration of the product to be purchased (e.g., when the product has several optional features available), a shipping address, a billing address, payment information, etc. prior to being connected to the telephone operator. The information may then be presented to the telephone operator when the user is connected to expedite the processing of the purchase. In some aspects, the live auction and/or the televised shopping program may provide preferred bid/order placement to users who utilize the application.

The Inventor has recognized that one or more of the aspects of the system described with reference to FIG. 1, as described further with reference to FIG. 2-5, may provide advantages over presently available POSs. One advantage is that not all POSs include display devices that are visible to the consumer. For example, in many restaurant settings, the POS is not within view the restaurant's consumer. Many times, the waiter may provide a bill for the meal that only includes the total sales price of the meal, as opposed to an itemized receipt for the meal. In such circumstances, many consumers simply pay the amount reflected on the bill, rather than requesting the itemized bill. In some instances, this may cause the consumer to pay for food and drink items that the consumer did not purchase. As another example, to alleviate long lines at the check-out registers during busy periods, some stores utilize employees using handheld POSs to manually scan items from carts of consumers. Such handheld POSs do not include a display device that presents information to the consumers. Thus, the consumer has no way of determining whether the items were scanned properly until after the transaction is completed (e.g., paid for the purchase and receives a receipt). By emulating the POS according to one or more aspects of the present disclosure, the consumer is able to view the itemized bill for the restaurant or the products scanned using the handheld POS from the consumer's mobile device, enabling the consumer to verify that the bill provided by the waiter is correct or that the items were scanned correctly by the store employee using the handheld POS.

According to another aspect of the present disclosure, the consumer is able to pay for the meal from the consumer's mobile device. This may eliminate the requirement that the consumer provide financial information, such as a credit card, to the waiter who then retains possession of the card for a few minutes while outside the view of the consumer. This may also eliminate the consumers susceptibility to a skimming attack, where the consumer, or a person the consumer entrusts with the financial card, swipes the financial card through a device that reads and stores the financial data from the financial card for illegal purposes. Additionally, the ability to initiate and/or process payments from the consumer's mobile device to the POS may reduce an amount of time that the consumer spends waiting for a bill, such as in the restaurant setting.

According to yet another aspect, some POSs may have small display devices that may not be read by all consumers, such as consumers who are visually impaired, while other POSs, such as POSs integrated with fuel pumps, may have display devices that are positioned outside of a line of sight for particular consumers. For example, a consumers in a wheelchair may not be able to read a display device that is positioned many feet off of the ground. Additionally, some POSs 110, such as outdoor POSs, include a display device that may be difficult to read (e.g., due to reaction of the display device with environmental factors, such as rain, wind, dust, etc.). Thus, enabling the consumer's mobile device to em elate a POS provides an advantage over such POSs.

According to another aspect, as the information associated with the emulation data is presented at the mobile device, the information may be presented as a list of items. As a display area for presentation of the list of items is filled, older items may be pushed off the top or bottom of the display area to make room for the most recently received items. However, the mobile device may enable the user to scroll through the list of items, enabling the user to see all of the items at any time during the consumer transaction. Thus, even if the consumer initiates emulation of the POS at the consumer's mobile device after the consumer transaction has already begun, the consumer may verify all of the items were scanned properly by scrolling through the list.

Additionally, when the consumer uses the application to scan the items prior to presenting the items at the checkout counter, the application may compare the products indicated by the emulation data to the products scanned by the consumer to check for discrepancies. For example, the consumer may have scanned a product once, but the cashier may have accidentally scanned the item twice. The application may highlight or otherwise flag the discrepancy at the mobile device, or provide information indicating the discrepancy to the POS to prompt the employee of the store to verify the products were scanned properly. This may reduce a number of items scanned an improper amount of times or a number of times that products were not scanned.

Figure 2:
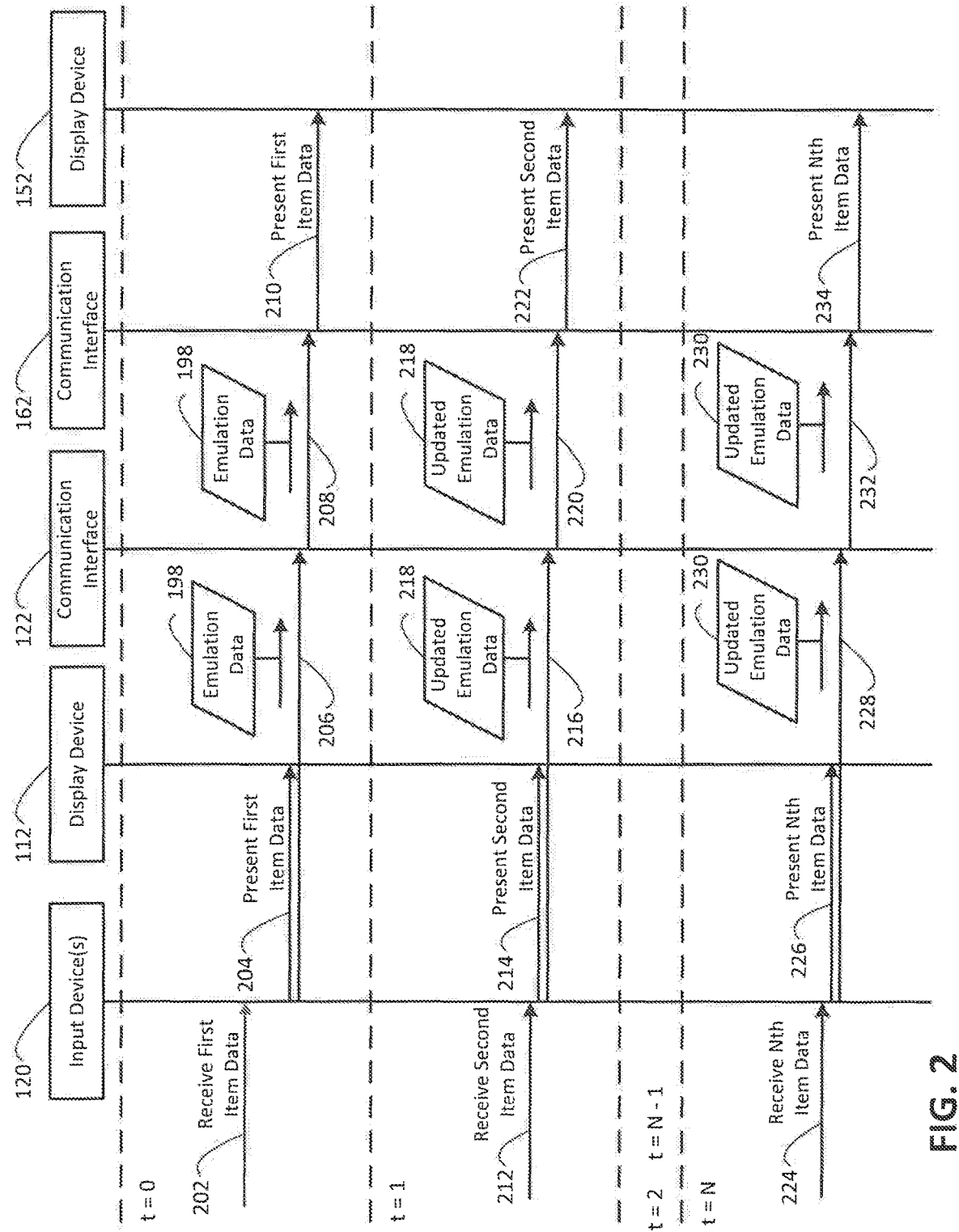
FIG. 2 is a ladder diagram illustrating aspects of data flow in a system configured to emulate a point of sale (POS) at a mobile device.

Referring to 2, a ladder diagram illustrating aspects of data flow in a system configured to emulate a point of sale (POS) at a mobile device is shown. In FIG. 2, the one or more input devices 120, the display device 112, the communication interface 122, the communication interface 162, and the display device 152 of FIG. 1 are shown. Additionally, FIG. 2 illustrates a plurality of time (t) instance starting at a time t=0 and running to a time t=N. In FIG. 2, it is assumed that a mobile device (e.g., the mobile device 150 of FIG. 1) has already established a connection (e.g., the connection 180 of FIG. 1) to a POS (e.g., the POS 110 of FIG. 1). However, in some aspects, the connection may be a connection (e,.g., the connection 176) to a device communicatively coupled to the POS (e.g., the server 130 of FIG. 1).

At t=0, an input device (e.g., the barcode scanner) of the one or more input devices 120 may receive, detect, or otherwise generate first item data, as indicated by the arrow 202. The first item data may be product information associated with a first product scanned using the input device. For example, the first item data may include a description of the first product, a price of the first product, etc., as described with reference to FIG. 1.

The POS may present the first item data at the display device 112, as indicated by the arrow 204. In some aspects, the POS may not include the display device 112 and the first item data may not be presented. Additionally, the POS may generate emulation data (e.g., the emulation data 198 of FIG. 1) and may initiate transmission of the emulation data to the mobile device by providing the emulation data to the communication interface 122 (e.g., the communication interface of the POS 110 of FIG. 1), as indicated by the arrow 206. The communication interface 122 may then provide the emulation data to the communication interface 122 (e.g., the communication interface of the mobile device 150 of FIG. 1), as indicated by the arrow 208.

The mobile device may receive the emulation data 198 and may initiate emulation of the POS by presenting the emulation data 198 at the display device 152, as indicated by the arrow 210. In an aspect, the emulation of the POS may be initiated by presenting the emulation data 198 at a user interface of an application (e.g., the application described with reference to FIG. 1) being executed (e.g., by the processor 154 of FIG. 1) of the mobile device. The first item data presented at the display device 112 and the emulation data 198 presented at the display device 152 during the time t=0 may be identical. In an aspect, the presentation of the presentation of the first item data at the display device 112 and the presentation of the emulation data 198 at the display device 152 may occur simultaneously (e.g., in real-time). In an additional or alternative aspect, the presentation of the first item data at the display device 112 and presentation of the emulation data at the display device 152 may occur in substantially real-time. Substantially real-time may mean with a minimal delay (e.g., less than one second).

At a time t=1, the input device (e.g., the barcode scanner or another one of the one or more input devices 120) may receive, detect, or otherwise generate second item data, as indicated by the arrow 212. The second item data may be product information associated with a second product scanned using the input device. For example, the second item data may include a description of the second product, a price of the second product, etc., as described with reference to FIG. 1.

The POS may present the second item data at the display device 112, as indicated by the arrow 214. In some aspects, the POS may not include the display device 112 and the second item data may not be presented. Additionally, the POS may generate updated emulation data 218 based on the second item data, and may initiate transmission of the updated emulation data 218 to the mobile device by providing the emulation data to the communication interface 122, as indicated by the arrow 216. The communication interface 122 may then provide the updated emulation data 218 to the communication interface 122, as indicated by the arrow 220.

The mobile device may receive the updated emulation data 218 and may dynamically update the emulation of the POS at the mobile device by presenting the updated emulation data 218 at the display device 152, as indicated by the arrow 222. The second item data presented at the display device 112 and the emulation data 218 presented at the display device 152 during the time t=1 may be identical. In an aspect, the presentation of the presentation of the second item data at the display device 112 and the presentation of the updated emulation data 218 at the display device 152 may occur simultaneously (e.g., in real-time). In an additional or alternative aspect, the presentation of the second item data at the display device 112 and the presentation of the updated emulation data 218 at the display device 152 may occur in substantially real-time. Substantially real-time may mean with a minimal delay (e.g., less than one second). In yet another additional or alternative aspect, the presentation of the second item data at the display device 112 and the presentation of the updated emulation data 230 at the display device 152 may occur at a desired frequency. For example, the POS may generate and transmit the emulation data a particular number of times over a time period (e.g., 10 times per minute, as described with reference to FIG. 1).

From a time t=2 to a time t=N-1, the POS may continue to receive additional item data via the one or more input device 120. As the additional item data is received, the POS may present the additional item data at the display device 112 and generate and provide additional updated emulation data to the communication interface 122. The communication interface 122 may transmit the additional updated emulation data to the communication interface 162 of the mobile device, and the mobile device may dynamically update the emulation of the POS at the mobile device based on the additional updated emulation data.

At a time t=N, the input device (e.g., the barcode scanner or another one of the one or more input devices 120) may receive, detect, or otherwise generate Nth item data, as indicated by the arrow 224. The Nth item data may be product information associated with an Nth product scanned using the input device. For example, the Nth item data may include a description of the Nth product, a price of the Nth product, etc., as described with reference to FIG. 1.

The POS may present the Nth item data at the display device 112, as indicated by the arrow 226. In some aspects, the POS may not include the display device 112 and the Nth item data may not be presented. Additionally, the POS may generate updated emulation data 230 based on the Nth item data, and may initiate transmission of the updated emulation data 230 to the mobile device by providing the emulation data to the communication interface 122, as indicated by the arrow 228. The communication interface 122 may then provide the updated emulation data 230 to the communication interface 122, as indicated by the arrow 232.

The mobile device may receive the updated emulation data 230 and may dynamically update the emulation of the POS at the mobile device by presenting the updated emulation data 230 at the display device 152, as indicated by the arrow 234. The Nth item data presented at the display device 112 and the emulation data 2.30 presented at the display device 152 during the time t=N may be identical. In an aspect, the presentation of the presentation of the Nth item data at the display device 112 and the presentation of the updated emulation data 230 at the display device 152 may occur simultaneously (e.g., in real-time). In an additional or alternative aspect, the presentation of the second item data at the display device 112 and the presentation of the updated emulation data 230 at the display device 152 may occur in substantially real-time. Substantially real-time may mean with a minimal delay (e.g., less than one second). In yet another additional or alternative aspect, the presentation of the second item data at the display device 112 and the presentation of the updated emulation data 230 at the display device 152 may occur at a desired frequency. For example, the POS may generate and transmit the emulation data a particular number of times over a time period (e.g., 10 times per minute, as described with reference to FIG. 1).

Additionally, it is noted that factors other than how often the POS generates and transmits the emulation data may affect whether the emulation of the POS at the mobile device occurs in real-time. For example, network conditions associated with a network through which the mobile device receives the emulation data may affect the ability of the mobile device to emulate the POS in real-time. Additionally, when the mobile device is coupled to the POS direction (e.g., via the connection 180 of FIG. 1), a speed of or a type of the connection to the POS may affect the ability of the mobile device to emulate the POS in real-time. The speed of the connection may be affected by interference from other devices proximate to the mobile device or interference caused by environmental factors (e.g., objects between the mobile device and communication interface 122 of the POS, etc.).

Figure 3:
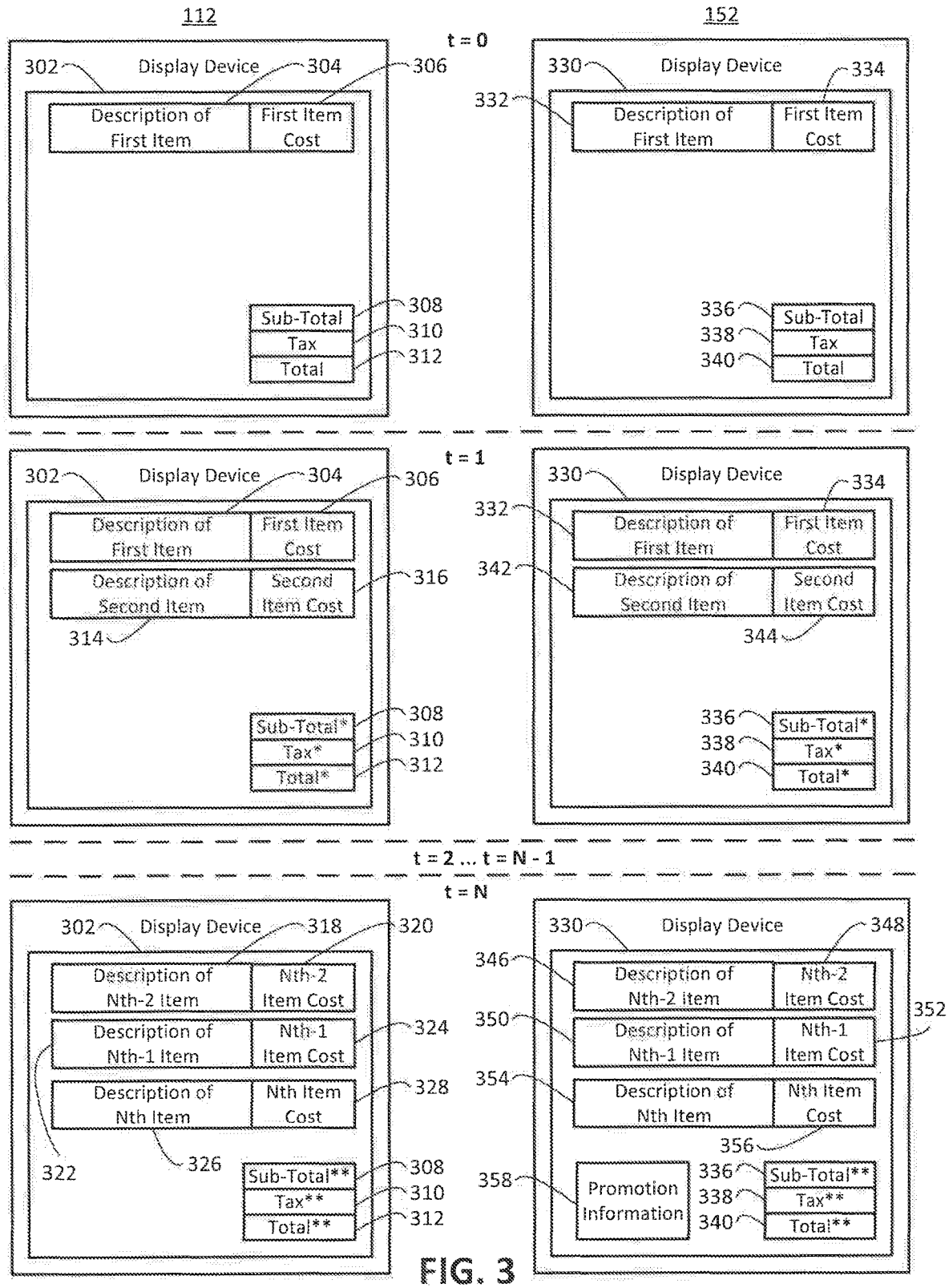
FIG. 3 illustrates aspects of emulating information presented at a display device of a point of sale (POS) at a mobile device.

Referring to FIG. 3, illustrative aspects of emulating information presented at a display device of a point of sale (POS) at a mobile device is shown. In FIG. 3, the display device 112 of the POS 110 and the display device 152 of the mobile device 150 of FIG. 1 are shown. As shown in FIG. 3, the display device 112 may include a display area 302 and the display device 152 may include a display area 330.

At the time t=0, the POS may receive first item data and may present the first item data at the display device 112, as described with reference to FIG. 2. The first item data may include a description of the first item 304 and a cost of the first item 306. The description of the first item 304 may be presented within the display area 302 in associated with (e.g., indicating a relationship between) the cost of the first item 306. Additional information may also be presented within the display area 302 of the display device 112. For example, information indicating a sub-total 308 for the purchase of the first item, information indicating an amount of tax 310 for the purchase of the first item, and information indicating a total 312 (e.g., a sum of the sub-total 308 and the tax 310) for the purchase of the first item may be shown within the display area 302. As the inputs associated with the products are received, a value of each of the sub-total 308, the tax 310, and the total 312 may be calculated by the POS and dynamically updated in real-time at the display device 112.

Additionally, at the time t=0, the POS may generate emulation data based on the first item data and may initiate transmission of the emulation data to the mobile device, as described with reference to FIG. 2. The emulation data may be received at the mobile device and, in response to receiving the emulation data, the mobile device may present the emulation data at the display device 152, as described with reference to FIG. 2. The emulation data, when presented within the display area 330 of the display device 152, may include a description of the first item 332 and a cost of the first item 334. In an aspect, the description of the first item 304 and the cost of the first item 306, as presented at the display device 112, and the description of the first item 332 and the cost of the first item 334, as presented at the display device 152 may be identical. In an aspect, the description of the first item 304 and the cost of the first item 306, as presented at the display device 112, and the description of the first item 332 and the cost of the first item 334, as presented at the display device 152 may be different. For example, the description of the first item 332 may be presented above the cost of the first item 334 at the display device 152, as opposed to side-by-side, as presented at the display device 112. This may be necessary because to the display area 302 may be larger than the display area 330. Additionally, the description of the first item 332 and the cost of the first item 334 may be presented with different fonts, font sizes, colors, etc. than fonts, font sizes, and colors used to present the description of the first item 304 and the cost of the first item 306 within the display area 302. The description of the first item 332 may be presented within the display area 302 in associated with (e.g., indicating relationship between) the cost of the first item 334.

Additional information may also be presented within the display area 330 of the display device 152. For example, information indicating a sub-total 336 for the purchase of the first item, information indicating an amount of tax 338 for the purchase of the first item, and information indicating a total 340 (e.g., a sum of the sub-total 336 and the tax 338) for the purchase of the first item may be shown within the display area 330. As additional inputs associated with additional products are received (e.g., during a period of time from the time t=2 to the time t=N), a value of each of the sub-total 336, the tax 338, and the total 340 may be received or calculated at the mobile device and dynamically updated in real-time at the display device 152, as described with reference to FIG. 1.

At the time t=1, the POS may receive second item data and may present the second item data at the display device 112, as described with reference to FIG. 2. The second item data may include a description of the second item 314 and a cost of the second item 316. The description of the second item 314 may be presented within the display area 302 in associated with (e.g., indicating a relationship between) the cost of the first item 316. When the input associated with the second product is received, the value of each of the sub-total 308, the tax 310, and the total 312 may be calculated by the POS and dynamically updated in real-time at the display device 112, as indicated by the (*).

As shown in FIG. 3, as additional inputs associated with additional products are received, the information associated with the additional product (e.g., the description of the second item 314 and the cost of the second item 316) may be presented below previously presented product information (e.g., the description of the first item 304 and the cost of the first item 306). As the display area 302 is populated with information associated with a plurality of products, the information (e.g., the description information and the cost information) associated with some of the products may be removed from view within the display area 302, as shown at the time t=N, where the description of the first item 304 and the cost of the first item 306 is not visible.

Additionally, at the time t=1, the POS may generate updated emulation data based on the second item data and may initiate transmission of the updated emulation data to the mobile device, as described with reference to FIG. 2. The updated emulation data may be received at the mobile device and, in response to receiving the updated emulation data, the mobile device may present the updated emulation data at the display device 152, as described with reference to FIG. 2. The updated emulation data, when presented within the display area 330 of the display device 152, may include a description of the second item 342 and a cost of the second item 344. When the updated emulation data associated with the second product is received at the mobile device, the value of each of the sub-total 336, the tax 338, and the total 340 may be dynamically updated in real-time at the display device 152, as indicated by the (*). The updated values of the sub-total 336, the tax 338, and the total 340 may be determined based on the updated emulation data or may be calculated by the mobile device, as described with reference to FIG. 1.

As shown in FIG. 3, as updated emulation data associated with additional products is received at the mobile device, the information associated with the additional product (e.g., the description of the second item 344 and the cost of the second item 346) may be presented below previously presented product information (e.g., the description of the first item 332 and the cost of the first item 334). As the display area 330 is populated with information associated with a plurality of products (e.g., based on received emulation data), the information (e.g., the description information and the cost information) associated with some of the products may be removed from view within the display area 330, as shown at the time t=N, where the description of the first item 332 and the cost of the first item 334 is not visible.

In an aspect, the description of the second item 314 and the cost of the second item 316, as presented at the display device 112, and the description of the second item 342 and the cost of the second item 344, as presented at the display device 152 may be identical. In an aspect, the description of the second item 314 and the cost of the second item 316, as presented at the display device 112, and the description of the second item 342 and the cost of the second item 344, as presented at the display device 152 may be different. For example, the description of the second item 342 may be presented above the cost of the second item 344 at the display device 152, as opposed to side-by-side, as presented at the display device 112. This may be necessary because to the display area 302 may be larger than the display area 330. Additionally, the description of the second item 342 and the cost of the second item 344 may be presented with different fonts, font sizes, colors, etc. than fonts, font sizes, and colors used to present the description of the second item 314 and the cost of the second item 316 within the display area 302. The description of the second item 342 may be presented within the display area 302 in associated with (e.g., indicating relationship between) the cost of the second item 344.

From a time t=2 to a time t=N-1, the POS may continue to receive additional item data via the one or more input device 120. As the additional item data is received, the POS may present the additional item data at the display device 112 and generate and provide additional updated emulation data to the communication interface 122. The communication interface 122 may transmit the additional updated emulation data to the communication interface 162 of the mobile device, and the mobile device may dynamically update the emulation of the POS at the mobile device based on the additional updated emulation data, At the time t=N, the POS may receive Nth item data and may present the Nth item data at the display device 112, as described with reference to FIG. 2. The Nth item data may include a description of the Nth item 326 and a cost of the Nth item 328. The description of the Nth item 326 may be presented within the display area 302 in associated with (e.g., indicating a relationship between) the cost of the Nth item 328. When the input associated with the Nth product is received, the value of each of the sub-total 308, the tax 310, and the total 312 may be calculated by the POS and dynamically updated in real-time at the display device 112, as indicated by the (**).

As shown in FIG. 3, as additional inputs associated with additional products are received, the information associated with the additional product (e.g., the description of the second item 314 and the cost of the second item 316) may be presented below previously presented product information (e.g., the description of the first item 304 and the cost of the first item 306). For example, as the display area 302 is populated with information associated with a plurality of products, the information (e.g., the description information and the cost information) associated with some of the products may be removed from view within the display area 302, as shown at the time t=N, where the description of the first item 304 and the cost of the first item 306 is not visible. Additionally, as shown at the time t=N, information (e.g., description information 318 and cost information 320) associated with an Nth-2 item and information (e.g., description information 322 and cost information 324) associated with an Nth-1 item may be visible within the display area 302, and the description of the first item 304, the cost of the first item 306, the description of the second item 314, and the cost of the second item 316 may not be visible within the display area 302.

Additionally, at the time t=N, the POS may generate additional updated emulation data based on the Nth items data and may initiate transmission of the additional updated emulation data to the mobile device, as described with reference to FIG. 2. The additional updated emulation data may be received at the mobile device and, in response to receiving the additional updated emulation data, the mobile device may present the additional updated emulation data at the display device 152, as described with reference to FIG. 2. The additional updated emulation data, when presented within the display area 330 of the display device 152, may include a description of the Nth item 354 and a cost of the Nth item 356. Additionally, as shown at the time t=N, information (e.g., description information 346 and cost information 348) associated with an Nth-2 item and information (e.g., description information 350 and cost information 352) associated with an Nth-1 item may be visible within the display area 330, and the description of the first item 332, the cost of the first item 334, the description of the second item 342, and the cost of the second item 344 may riot be visible within the display area 302.

When the additional updated emulation data associated with the Nth product is received at the mobile device, the value of each of the sub-total 336, the tax 338, and the total 340 may be dynamically updated in real-time at the display device 152, as indicated by the (**). The updated values of the sub-total 336, the tax 338, and the total 340 may be determined based on the additional updated emulation data or may be calculated by the mobile device, as described with reference to FIG. 1.

As shown in FIG. 3, as additional emulation data associated with the additional products is received at the mobile device, the additional emulation data may be may be presented below previously presented emulation data. For example, as the display area 330 is populated with information associated with a plurality of products, the information (e.g., the description information and the cost information) associated with some of the products may be removed from view within the display area 330, as shown at the time t=N, where the description of the first item 332, the cost of the first item 334, the description of the second item 342, and the cost of the second item 344 are not visible. Additionally, as shown at the time t=N, information (e.g., the description information 346 and the cost information 348) associated with the Nth-2 item and information (e.g., description information 350 and cost information 352) associated with the Nth-1 item may be visible within the display area 330, and the description of the first item 332, the cost of the first item 334, the description of the second item 342, and the cost of the second item 344 may riot be visible within the display area 302.

In an aspect, the description of the Nth item 326 and the cost of the Nth item 328, as presented at the display device 112, and the description of the Nth item 354 and the cost of the Nth item 356, as presented at the display device 152 may be identical. In an aspect, the description of the Nth item 326 and the cost of the Nth item 328, as presented at the display device 112, and the description of the Nth item 354 and the cost of the Nth item 356, as presented at the display device 152 may be different. For example, the description of the Nth item 354 may be presented above the cost of the Nth item 356 at the display device 152, as opposed to side-by-side, as presented at the display device 112. This may be necessary because to the display area 302 may be larger than the display area 330. Additionally, the description of the nth item 354 and the cost of the Nth item 356 may be presented with different fonts, font sizes, colors, etc. than fonts, font sizes, and colors used to present the description of the Nth item 326 and the cost of the Nth item 328 within the display area 302. The description of the Nth item 354 may be presented within the display area 330 in association with (e.g., indicating relationship between) the cost of the Nth item 356.

In an aspect, the emulation data presented within the display area 330 may be presented within a user interface of an application executing on the mobile device, as described with reference to FIG. 1. The emulation data may be presented as a scrollable list. For example, at the time t=N, the user may be able to scroll up and view the description of the first item 332 and the cost of the first item 334. Such functionality is not available to the consumer at presently available POSs.

As shown in FIG. 3, the mobile device may further receive promotion information 358 (e.g., an advertisement, a discount, a coupon, etc.). As shown in FIG. 3, the promotion information 358 may displayed within the display area 330. In an aspect, the user interface of the application may reserve a space, such as a space next to the sub-total 336, the tax 338, and the total 340 for presenting the promotional information 358. In an additional or alternative aspect, the promotion information 358 may be presented within the display area 330 in connection with a corresponding item. For example, when the promotion information 358 is a coupon for an item, an icon or symbol may be presented proximate the description or the price information corresponding to the product. The consumer associated with the mobile device may select the icon or symbol to view the coupon. In some aspects, the coupon or other type of discount may be immediately redeemable and the consumer may redeem the coupon to reduce the total 340. In other additional or alternative aspects, the coupon or the other type of discount may be redeemable during a subsequent visit to a particular store associated with the POS and the user may provide an input to the user interface requesting to store the promotion information for use during the subsequent visit.

During the subsequent visit, the application may prompt the user to remind the user of the coupon. The application may provide other reminders as well, such as when rewards earned through one or more loyalty reward programs are about to expire, when a stored coupon is about to expire, a sale on a product the consumer frequently purchases that is about end, whether a particular store is participating in a promotional campaign (e.g., accepting a coupon, participating in a sale, etc.). In still other additional or alternative aspects, the reminders provided via the application may include reminders associated with method of payment recommendations. For example, the application may determine, based on loyalty reward program information, that more rewards (e.g., double rewards), a particular type of reward (e.g., airline miles), or a redeemable reward (e.g., enough miles for a flight to a destination of interest to the consumer) would be earned if the consumer uses a particular financial card to pay for the consumer transaction.

In some aspects, the promotion information 35$ may include audiovisual information, such as a video comparing two products. A first product the two products may be a product that the consumer frequently purchases, as determined based on analysis of the consumer's purchase history by the application and/or another device (e.g., the server 130), and a second product of the two products may be a different product (e.g., different brand, different model, different size, etc.) that an influencer (e.g., a manufacturer of the second product, a store desiring to sell the product, etc.) wants to promote to the consumer. In some aspects, the promotion information 358 may include a combination of audiovisual information, coupons, etc.

In still another aspect, the promotion information 358 may be received from a device unrelated to the store where the consumer is located. For example, the application may cause the mobile device to communicate with a server associated with a marketing company (or other type of influencer) and the promotion information 358 may indicate that at least one of the products being purchased by the consumer is available at a different store for a lower price. Additionally, the promotion information 358 may offer the consumer a discount for participating in a survey and the consumer may initiate and complete the survey at the mobile device (e.g., using the application or a web-link to the survey provided via the application).

In yet another aspect, the promotion information 358 may include up-sale information, such as offering the consumer a warranty on a product (e.g., the Nth item) being purchased during the consumer transaction. Additionally, the application may offer the consumer an opportunity to purchase additional warranties for previous purchases during the consumer transaction. The up-sale information may also offer the consumer the opportunity to purchase additional items that are not available in the store. If the consumer purchases one of the additional items, the consumer may pay for the additional item during the consumer transaction and the additional item may be automatically shipped to an address designated by the consumer (e.g., in a user profile or via an input provided at the user interface of the application). For example, if the consumer is purchasing a product that has one or more attachments or complementary components that may be purchased separately, and the store is out of stock on a complementary component that the consumer wanted to buy, the promotion information 358 provided to the mobile device may enable the user to select the out of stock complementary component and have it shipped to the consumer automatically. This may alleviate the consumer having to go to another store to find the complementary component and may also allow the store to obtain the sale, rather than a competitor store.

Figure 4:
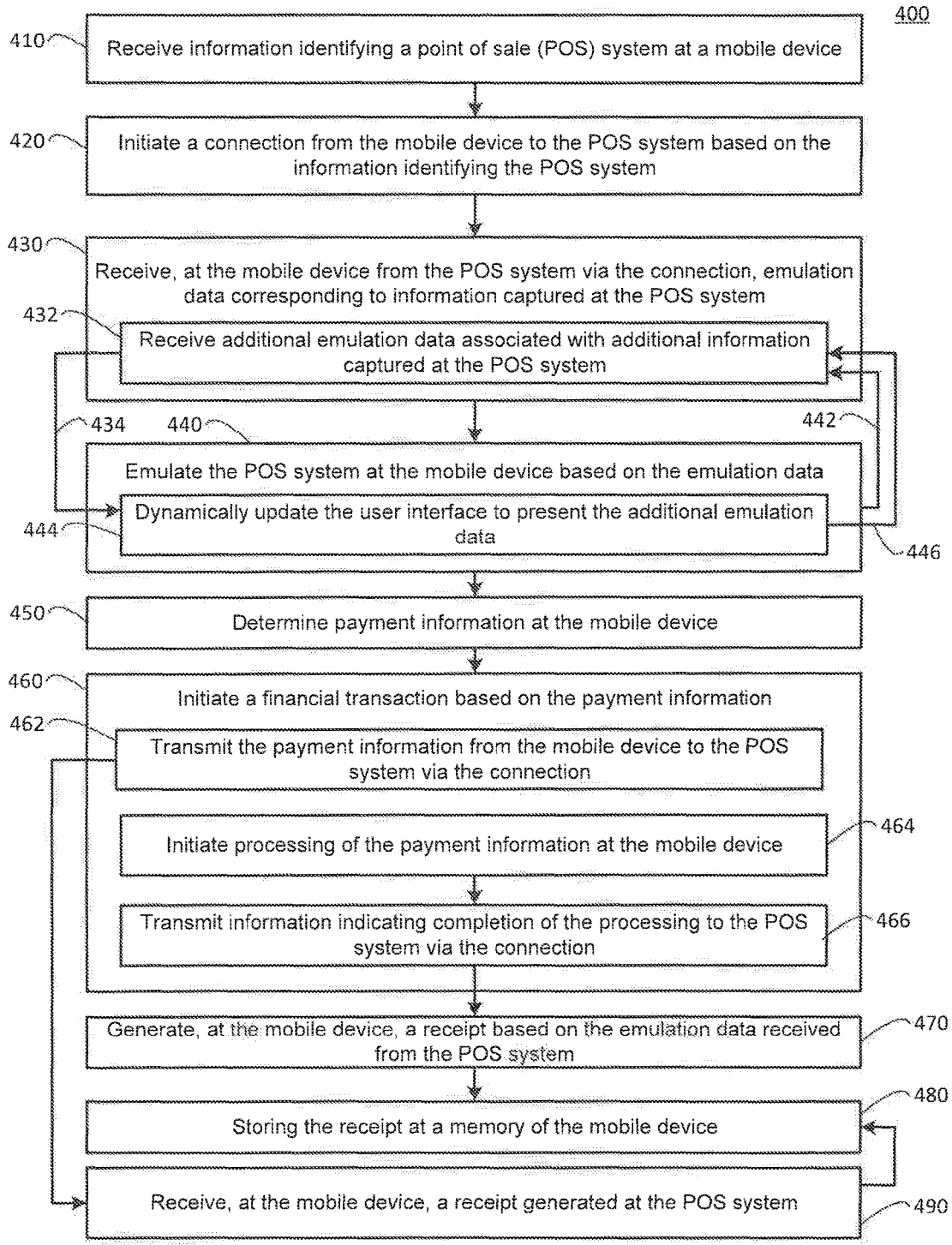
FIG. 4 is a flow chart illustrating aspects of a method for emulating a point of sale (POS) at a mobile device.

Referring to FIG. 4, a flow chart illustrating aspects of a method for emulating a point of sale (POS) at a mobile device is shown and is designated 400. As shown in FIG. 4, the method 400 includes, at 410 receiving information identifying a point of sale (POS) at a mobile device. The mobile device may be the mobile device 150 and the information may be received at the mobile device using one or more of the methods (e.g., a QR code, a barcode, an RFID tag, user input received via a user interface of an application executing on the mobile device, etc.), as described with reference to FIG. 1. At 420, the method 400 includes initiating a connection from the mobile device to the POS. As described with reference to FIG. 1, the connection may initiated based on the information identifying the POS. Additionally, the connection may be a direct connection (e.g., the connection 180 of FIG. 1) to the POS, an indirect connection (e.g., the connection 176 of FIG. 1) to the POS or another device (e.g., the server 130 of FIG. 1) in communication with the POS.

At 430, the method 400 includes receiving, at the mobile device via the connection, emulation data from the POS. The emulation data may correspond to information (e.g., a description of each of one or more products, a price of each of the one or more products, a sub-total for a consumer transaction, a total tax applied to the consumer transaction, a total price for the consumer transaction, other information associated with the product or the consumer transaction, promotion information, or a combination thereof) captured at the POS, as described with reference to FIGS. 1-3. At 440, the method 400 includes emulating the POS at the mobile device based on the emulation data. Emulating the POS at the mobile device may include presenting the emulation data at a display device (e.g., the display device 152 of FIG. 1) of the mobile device. If the POS includes a display device (e.g., the display device 112 of FIG. 1), the emulation data presented at the display device of the mobile device may mirror information presented at the display device of the POS.

As indicated by the arrow 442, the method 400 may include, at 432, receiving additional emulation data associated with additional information captured at the POS. As indicated by the arrow 434, the method 400 may include, at 444, dynamically updating the emulation of the POS at the mobile device based on the additional emulation data. For example, as described with reference to FIGS. 1-3, the consumer transaction may include a purchase of a plurality of products. As information associated with each product is captured at the POS, the POS or another device (e.g., the server 130) may generate the emulation data and the additional emulation data and provide the emulation data to the mobile device.

At 450, the method 400 includes determining payment information at the mobile device. The payment information may be associated with a financial card. The financial card may be a credit card, a debit card, a gift card, information associated with a loyalty reward program (e.g., a fixed amount discount or a percentage amount discount, etc.), or a combination thereof. In an aspect, the payment information may be determined based on financial card information or loyalty reward program information stored at a memory (e.g., the memory 156) of the mobile device. In an additional or alternative aspect, the payment information may be determined based on information read from a financial card using a financial card reader device coupled to the mobile device, as described with reference to FIG. 1. In yet another additional or alternative aspect, the payment information may be stored at a device (e.g., the server 130 of FIG. 1) external to the mobile device, such as by storing the financial card information, the loyalty reward program information, etc. in association with a user profile of a consumer associated with the mobile device, and the mobile device may determine the payment information by retrieving the payment information from the external device.

At 460, the method 400 includes initiating, at the mobile device, a financial transaction based on the payment information. In an aspect, initiating the financial transaction may include transmitting the payment information from the mobile device to the POS or another device (e.g., the server 130 of FIG. 1) via the connection. The POS or the other device may process the payment information, and the processing of the payment information may charge a financial account associated with the financial card an amount corresponding to a total sales price of one or more products purchased by a consumer associated with the mobile device, less any discounts applied using coupons, loyalty reward program discounts, etc. In an additional or alternative aspect, initiating the financial transaction may include initiating processing of the payment information (e.g., establishing a connection to a payment processing entity via a financial card network or other network) at the mobile device. The processing of the payment information from the mobile device may charge the financial account associated with the financial card an amount corresponding to a total sales price of one or more products purchased by a consumer associated with the mobile device, less any discounts applied using coupons, loyalty reward program discounts, etc. The mobile device may receive information confirming that the processing of the financial transaction completed successfully (e.g., the payment has been authorized). When the processing of the payment information occurs via the mobile device, the method 400 may include, at 458, transmitting information (e.g., the information confirming that the processing of the financial transaction completed successfully) indicating completion of the processing to the POS via the connection.

At 470, the method 400 includes generating, at the mobile device, a receipt based on the emulation data received from the POS. At 480, the method 400 may include storing the receipt at the memory of the mobile device. In an aspect, the application executing on the mobile device may enable the consumer to view a plurality of stored receipts at the mobile device. When the processing of payment information (e.g., the payment information received from the mobile device) at the POS is completed successfully, the POS may generate a paper receipt (e.g., using a printer coupled to the POS)

and/or may generate an electronic receipt, as described with reference to FIG. 1. At 490, the method 400 may include receiving, from the POS at the mobile device, the receipt generated by the POS.

Figure 5:
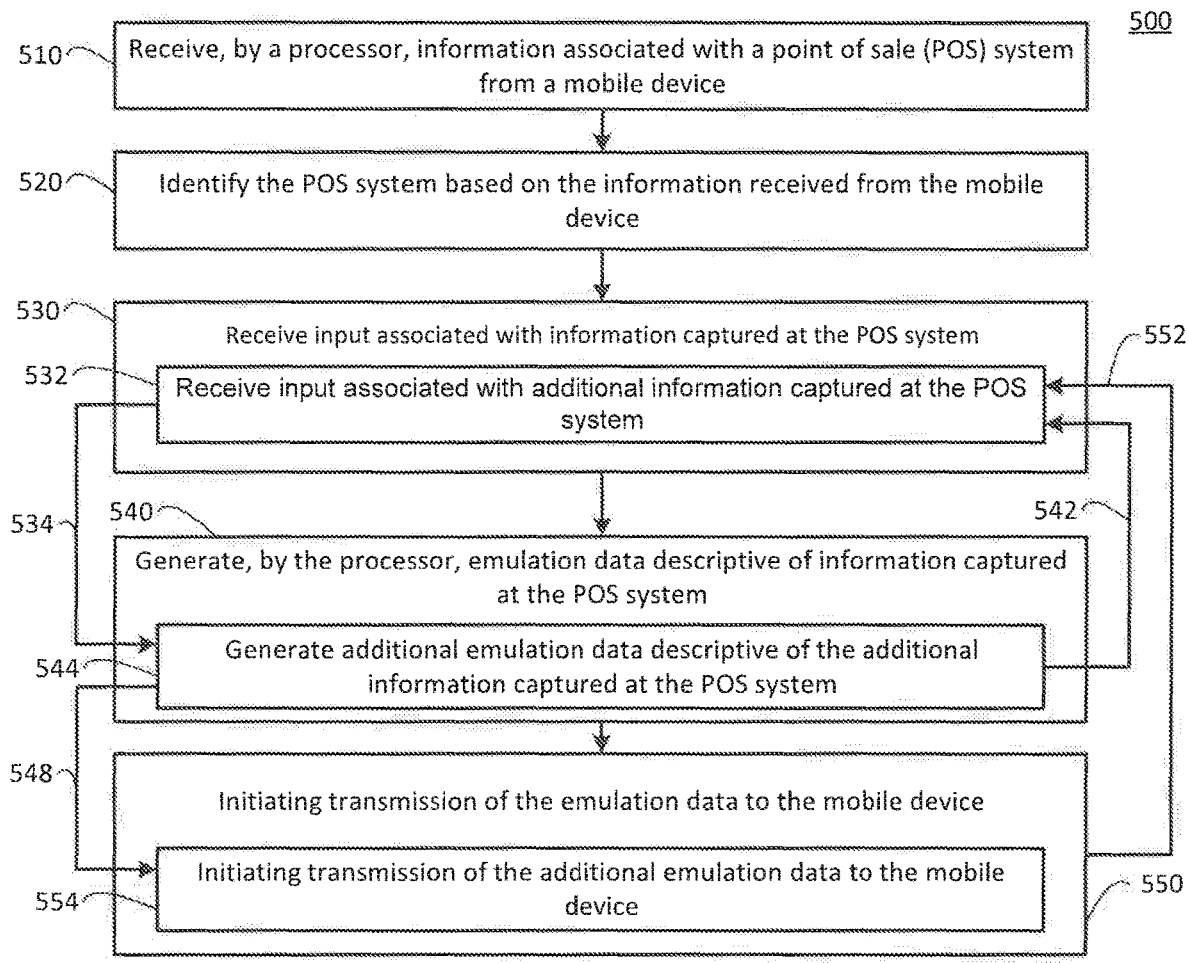
FIG. 5 is a flow chart illustrating aspects of a method for generating emulation data associated with a point of sale (POS) and initiating transmission of the emulation data to a mobile device to cause the mobile device to emulate the POS.

Referring to FIG. 5, a flow chart of illustrating aspects of a method for generating emulation data associated with a point of sale (POS) and initiating transmission of the emulation data to a mobile device to cause the mobile device to emulate the POS is shown. As shown in FIG. 5, the method 500 includes, at 510, receiving information associated with a point of sale (POS) from a mobile device. In an aspect, the information may be received at the POS (e.g., the POS 110 of FIG. 1). In another aspect, the information may be received at a device (e.g., the server 130 of FIG. 1) other than the POS. At 420, the method 500 includes identifying the POS based on the information received from the mobile device.

At 430 the method 500 includes, receiving input associated with information captured at the POS. The information captured at the POS may include information associated with one or more products scanned using a barcode scanner of the POS, as described with reference to FIG. 1, or an amount of fuel dispensed by a fuel pump that includes the POS, as described with reference to FIG. 1. At 540, the method 500 includes generating emulation data descriptive of information captured at the POS. The emulation data may include information (e.g., a description of each of one or more products, a price of each of the one or more products, a sub-total for a consumer transaction, a total tax applied to the consumer transaction, a total price for the consumer transaction, other information associated with the product or the consumer transaction, promotion information, an amount of fuel dispensed by a fuel pump, or a combination thereof) captured by the POS device.

At 550, the method 500 includes initiating transmission of the emulation data to the mobile device. The emulation data may cause the mobile device to emulate the POS. To illustrate, emulating the POS at the mobile device may include presenting the emulation data at a display device (e.g., the display device 152 of FIG. 1) of the mobile device. If the POS includes a display device (e.g., the display device 112 of FIG. 1), the emulation data presented at the display device of the mobile device may mirror information presented at the display device of the POS.

As indicated by the arrow 552, the method may include, at 532, receiving additional input associated with additional information captured at the POS. The additional input may be associated with additional products scanned using the barcode reader (or another input device of the POS) or additional fuel dispensed from the fuel pump after the emulation data was generated at 540 and transmitted to the mobile device at 550. As indicated by the arrow 534, the method 500 may include generating additional emulation data descriptive of the additional information captured at the POS. As indicated by the arrow 548, the method 500 may include, at 554, initiating transmission of the additional emulation data to the mobile device. The POS may continue to receive, at 532, the additional input associated with additional information (e.g., additional products or updated amounts of fuel dispensed) captured at the POS, and may continue to generate, at 544, the additional emulation data, and may continue to initiate transmission, at 554, of the additional emulation data to the mobile device until all inputs have been received (e.g., all products have been scanned at the POS, or a threshold amount of fuel has been dispensed).

In an aspect, the method 500 may include processing additional information, such as payment information, promotion information, product recommendation information, etc., as described with reference to FIG. 1. Additionally, the method 500 may include, as described with reference to FIG. 1, generating and initiating transmission of the emulation data and the additional emulation data at a device (e.g., the server 130) other than the POS. Thus, the method 500 may include other features described herein in connection with FIGS. 1-3, and such other features are not shown in FIG. 5 for simplicity of description.

Although the present invention and its advantages have been described in detail, it should be understood that various changes, substitutions and alterations can be made herein without departing from the spirit and scope of the invention as defined by the appended claims. Moreover, the scope of the present application is riot intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for emulating a point of sale (POS) of a retailer at a user device, the method comprising:
    scanning, via a scanner of the POS, a plurality of products during a transaction conducted at the POS;
    generating, by one or more processors of the POS, emulation data messages as the plurality of products are scanned, wherein each emulation data message comprises product information captured by the POS as a plurality of products are scanned;
    transmitting, by the one or more processors, the emulation data messages to the user device, wherein different emulation data messages are transmitted to the user device at different times during the transaction;
    displaying the product information at a display of the POS, wherein the transmitted emulation data messages are configured to initiate display of the product information included in the emulation data messages at the user device concurrently with the displaying of the product information at the display of the POS;
    generating, by the one or more processors, an authentication code for the transaction;
    transmitting, by the one or more processors, the authentication code to the user device for display;
    receiving, by the one or more processors, an authentication input at an input device of the POS;
    validating, by the one or more processors, the authentication input against the authentication code transmitted to the user device; and
    executing, by the one or more processors, a financial transaction configured to pay a payment amount for the transaction to the retailer in response to successful validation of the authentication input against the authentication code.

2. The method of claim 1, wherein, for each scanned product, the displayed product information comprises at least a sales price and a product description.

3. The method of claim 1, further comprising:
calculating a total price for the transaction, wherein the total price for the transaction is updated as each product of the plurality of products is scanned; and
displaying the total price at the display of the POS, wherein the displayed total price is updated as each product of the plurality of products is scanned.

4. The method of claim 1, further comprising:
receiving payment information from a user, wherein executing the financial transaction comprises:
processing the payment information to pay the payment amount to the retailer in response to successful validation of the authentication input against the authentication code.

5. The method of claim 1, further comprising:
receiving information associated with a loyalty reward program; and
reducing the payment amount based on the information associated with the loyalty reward program.

6. The method of claim 5, further comprising:
providing an offer to the user device, wherein the offer is associated with a product sold by second retailer that is a third party to the retailer;
receiving information indicating a user has accepted the offer, wherein the total price for the transaction includes payment for the product sold by the second retailer; and
providing a receipt to the user device that comprises information that enables the user to pick up the product sold by the second retailer from a remote retail store.

7. The method of claim 1, further comprising printing a receipt for the transaction.

8. The method of claim 7, further comprising storing the receipt at a database.

9. The method of claim 1, further comprising transmitting an electronic receipt for the transaction to the user.

10. The method of claim 9 wherein the electronic receipt is transmitted to the user via an e-mail address, a text message, or both.

11. A computer-readable storage device storing instructions that, when executed by one or more processors, cause the one or more processors to perform operations for emulating a point of sale (POS) of a retailer at a user device, the operations comprising:
scanning, via a scanner of the POS, a plurality of products during a transaction conducted at the POS;
generating emulation data messages as the plurality of products are scanned, wherein each emulation data message comprises product information captured by the POS as a plurality of products are scanned;
transmitting the emulation data messages to the user device, wherein different emulation data messages are transmitted to the user device at different times during the transaction;
displaying the product information at a display of the POS, wherein the transmitted emulation data messages are configured to initiate display of the product information included in the emulation data messages at the user device concurrently with the displaying of the product information at the display of the POS;
generating an authentication code for the transaction;
transmitting the authentication code to the user device for display;
receiving an authentication input at an input device of the POS;
validating the authentication input against the authentication code transmitted to the user device; and
executing a financial transaction configured to pay a payment amount for the transaction to the retailer in response to successful validation of the authentication input against the authentication code.

12. The computer-readable storage device of claim 11, wherein, for each scanned product, the displayed product information comprises at least a sales price and a product description.

13. The computer-readable storage device of claim 11, the operations further comprising:
calculating a total price for the transaction, wherein the total price for the transaction is updated as each product of the plurality of products is scanned; and
displaying the total price at the display of the POS, wherein the displayed total price is updated as each product of the plurality of products is scanned.

14. The computer-readable storage device of claim 11, the operations further comprising:
receiving payment information from a user, wherein executing the financial transaction comprises:
processing the payment information to pay the payment amount to the retailer in response to successful validation of the authentication input against the authentication code.

15. The computer-readable storage device of claim 11, the operations further comprising:
receiving information associated with a loyalty reward program; and
reducing the payment amount based on the information associated with the loyalty reward program.

16. The computer-readable storage device of claim 15, the operations further comprising:
providing an offer to the user device, wherein the offer is associated with a product sold by second retailer that is a third party to the retailer;
receiving information indicating the user has accepted the offer, wherein the total price for the transaction includes payment for the product sold by the second retailer; and
providing a receipt to the user device that comprises information that enables the user to pick up the product sold by the second retailer from a remote retail store.

17. The computer-readable storage device of claim 11, the operations further comprising:
generating a receipt for the transaction;
providing the receipt to the user, wherein the receipt is provided to the user via an e-mail, a text message, a printed receipt, or a combination thereof; and
storing the receipt at a database.

18. A system for emulating a point of sale (POS) of a retailer at a user device, the system comprising:
a scanner;
a display device;
a memory; and
one or more processors configured to:
receive information associated with a plurality of products scanned via the scanner during a transaction conducted at the POS;
generate emulation data messages as the plurality of products are scanned, wherein each emulation data message comprises product information captured by the POS as a plurality of products are scanned;
transmit the emulation data messages to the user device, wherein different emulation data messages are transmitted to the user device at different times during the transaction;

display the product information at the display device, wherein the transmitted emulation data messages are configured to initiate display of the product information included in the emulation data messages at the user device concurrently with the displaying of the product information at the display device;

generate an authentication code for the transaction;

transmit the authentication code to the user device for display;

receive an authentication input at an input device of the POS;

validate the authentication input against the authentication code transmitted to the user device; and execute a financial transaction configured to pay a payment amount for the transaction to the retailer in response to successful validation of the authentication input against the authentication code.

19. The system of claim 18, further comprising a printer configured to print a receipt for the transaction.

20. The system of claim 18, wherein the one or more processors are configured to:

generate a receipt for the transaction;

provide the receipt to a user via an e-mail message, a text message, a printed receipt, or a combination thereof: and store the receipt at the memory.

\* \* \* \* \*

UNITED STATES PATENT AND TRADEMARK OFFICE
CERTIFICATE OF CORRECTION

PATENT NO. : 10,997,576 B2
APPLICATION NO. : 16/431342
DATED : May 4, 2021
INVENTOR(S) : Dickson Perry Page 1 of 2

It is certified that error appears in the above-identified patent and that said Letters Patent is hereby corrected as shown below:

In the Specification

At Column 2, Line number 39, delete "POS.," and replace with --POS,--.
At Column 3, Line number 3, delete "should he" and replace with --should be--.
At Column 4, Line number 20, delete "seamier" and replace with --scanner--.
At Column 4, Line number 31, delete "PDS 110" and replace with --POS 110--.
At Column 4, Line number 63, delete "PDS 110" and replace with --POS 110--.
At Column 4, Line number 66, delete "PDS 110" and replace with --POS 110--.
At Column 5, Line number 15, delete "network. 170" and replace with --network 170--.
At Column 6, Line number 61, delete "(OLEO)" and replace with --(OLED)--.
At Column 7, Line number 24, delete "he limited" and replace with --be limited--.
At Column 7, Line number 53, delete "financial, card" and replace with --financial card--.
At Column 8, Line number 57, delete "POS 110, in an aspect" and replace with --POS 110. In an aspect--.
At Column 9, starting at Line number 15, delete "mobile device 150 by the processor" and replace with --mobile device 150 (e.g., by the processor--.
At Column 12, Line number 8, delete "cumulation data" and replace with --emulation data--.
At Column 18, Line number 34, delete "purchased by, the user" and replace with --purchased by the user--.
At Column 19, Line number 16, delete "inserting, a" and replace with --inserting a--.
At Column 21, Line number 17, delete "where, the valet" and replace with --where the valet--.
At Column 21, Line number 21, delete "may pay fix" and replace with --may pay for--.
At Column 22, Line number 53, delete "em elate" and replace with --emulate--.
At Column 23, Line number 14, delete "Referring to 2" and replace with --Referring to Fig. 2--.
At Column 25, Line number 15, delete "data 2.30" and replace with --data 230--.
At Column 28, Line number 48, delete "Nth items" and replace with --Nth item--.
At Column 28, Line number 67, delete "riot" and replace with --not--.
At Column 29, Line number 29, delete "riot" and replace with --not--.
At Column 30, Line number 36, delete "information 35$" and replace with --information 358--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*

At Column 34, Line number 17, delete "riot" and replace with --not--.

In the Claims

At Column 37, Claim number 20, Line number 24, delete "thereof:" and replace with --thereof;--.